(12) United States Patent
Joraid et al.

(10) Patent No.: US 12,367,688 B1
(45) Date of Patent: Jul. 22, 2025

(54) SYSTEMS AND METHODS FOR DETECTING BAD TELEMATICS DEVICE INSTALLATIONS

(71) Applicant: Geotab Inc., Oakville (CA)

(72) Inventors: Omar Khalid Ahmad Joraid, Mississauga (CA); Varun Naroia, Waterloo (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 19/073,650

(22) Filed: Mar. 7, 2025

(51) Int. Cl.
| | | |
|---|---|---|
| *G06V 20/00* | (2022.01) | |
| *G06N 3/0464* | (2023.01) | |
| *G06T 7/00* | (2017.01) | |
| *G06V 10/764* | (2022.01) | |
| *G06V 10/776* | (2022.01) | |
| *G06V 10/778* | (2022.01) | |
| *G06V 10/82* | (2022.01) | |
| *G06V 20/59* | (2022.01) | |

(52) U.S. Cl.
CPC ........... *G06V 20/59* (2022.01); *G06N 3/0464* (2023.01); *G06T 7/0002* (2013.01); *G06V 10/764* (2022.01); *G06V 10/776* (2022.01); *G06V 10/7784* (2022.01); *G06V 10/82* (2022.01); *G06T 2207/20081* (2013.01); *G06T 2207/20084* (2013.01); *G06T 2207/30268* (2013.01)

(58) Field of Classification Search
CPC .... G06V 20/59; G06V 10/764; G06V 10/776; G06V 10/7784; G06V 10/82; G06N 3/0464; G06T 7/0002; G06T 2207/20081; G06T 2207/20084; G06T 2207/30268
See application file for complete search history.

(56) References Cited

U.S. PATENT DOCUMENTS

| | | | |
|---|---|---|---|
| 2023/0230426 A1* | 7/2023 | Reziapova | G06Q 10/20 701/29.6 |
| 2023/0247271 A1* | 8/2023 | Mirchef | H04N 23/54 348/148 |

\* cited by examiner

*Primary Examiner* — Ping Y Hsieh
(74) *Attorney, Agent, or Firm* — Lawrence Xin-Tao Yu

(57) ABSTRACT

Systems and methods for detecting bad installations of telematics devices are provided. The method involves operating at least one processor to: receive image data associated with an installation of a telematics device in a vehicle; extract a portion of the image data containing the telematics device using a first machine learning model trained to detect the telematics device in the image data; determine whether the telematics device was correctly installed using a second machine learning model on the extracted portion of the image data, the second machine learning model trained to classify the telematics device in the extracted portion of the image data based on a position and orientation of at least one fastener attached to the telematics device; and automatically execute at least one action in response to and based on the determination of whether the telematics device was correctly installed.

21 Claims, 23 Drawing Sheets

SYSTEMS AND METHODS FOR DETECTING BAD TELEMATICS DEVICE INSTALLATIONS

FIELD

The embodiments described herein generally relate to vehicles and telematics devices, and in particular, to detecting bad telematics device installations.

BACKGROUND

The following is not an admission that anything discussed below is part of the prior art or part of the common general knowledge of a person skilled in the art.

An improper, incorrect, or bad installation of a telematics device can negatively affect the operation of the device. Bad installations can degrade device performance, cause devices to malfunction, or even lead to device failure. Bad installations can result in unnecessary support requests, warrantee claims, device returns, and service cancellations. However, troubleshooting telematics device installations can be difficult. Previous approaches have typically involved manually inspecting potentially improperly installed telematics devices. However, manual inspections can be time-consuming and inaccurate.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with a broad aspect, there is provided a method for detecting bad installations of telematics devices. The method involves operating at least one processor to: receive image data associated with an installation of a telematics device in a vehicle; extract a portion of the image data containing the telematics device using a first machine learning model trained to detect the telematics device in the image data; determine whether the telematics device was correctly installed using a second machine learning model on the extracted portion of the image data, the second machine learning model trained to classify the telematics device in the extracted portion of the image data based on a position and orientation of at least one fastener attached to the telematics device; and automatically execute at least one action in response to and based on the determination of whether the telematics device was correctly installed.

In accordance with a broad aspect, there is provided a non-transitory computer readable medium having instructions stored thereon executable by at least one processor to implement the method of any one of the methods described herein.

In accordance with a broad aspect, there is provided a system for detecting bad installations of telematics devices. The system includes at least one data storage and at least one processor in communication with the at least one data storage. The at least one processor is operable to: receive image data associated with an installation of a telematics device in a vehicle; extract a portion of the image data containing the telematics device using a first machine learning model trained to detect the telematics device in the image data; determine whether the telematics device was correctly installed using a second machine learning model on the extracted portion of the image data, the second machine learning model trained to classify the telematics device in the extracted portion of the image data based on a position and orientation of at least one fastener attached to the telematics device; and automatically execute at least one action in response to and based on the determination of whether the telematics device was correctly installed.

In some embodiments, the at least one processor can: determine that the first machine learning model detected the telematics device in the image data and the extracted portion of the image data does not contain the telematics device; and the at least one action can involve retraining the first machine learning model using the image data.

In some embodiments, the extracted portion of the image data can contain a serial number and/or barcode.

In some embodiments, the extracted portion of the image data can contain an accessory device.

In some embodiments, the at least one processor can: determine that the second machine learning model classified the telematics device as correctly installed and the telematics device was not correctly installed; and the at least one action can involve retraining the second machine learning model using the extracted portion of the image data.

In some embodiments, the second machine learning model can classify the telematics device based on a quantity of fasteners in the at least one fastener.

In some embodiments, the second machine learning model can classify the telematics device based on whether the at least one fastener encircles the telematics device.

In some embodiments, the second machine learning model can classify the telematics device based on whether the at least one fastener is perpendicular or parallel to a cable harness attached to the telematics device.

In some embodiments, the at least one fastener can include at least one zip tie.

In some embodiments, the at least one fastener can include a first fastener and a second fastener.

In some embodiments, the first fastener can be attached between the telematics device and the vehicle.

In some embodiments, the second fastener can be attached between the telematics device and a cable harness.

In some embodiments, the second machine learning model can classify the telematics device based on whether the first and second fasteners intersect.

In some embodiments, the second machine learning model can classify the telematics device based on whether the first and second fasteners are perpendicular to each other.

In some embodiments, the second machine learning model can classify the telematics device based on whether an intersection of the first and second fasteners is substantially in the middle of the telematics device.

In some embodiments, the second machine learning model can classify the telematics device based on a position and orientation of the telematics device.

In some embodiments, the second machine learning model can classify the telematics device based on a position and orientation of the first fastener relative to the second fastener.

In some embodiments, the first machine learning model can be a convolutional neural network.

In some embodiments, the second machine learning model can be a convolutional neural network.

In some embodiments, the at least one processor can: receive telematics data from the telematics device; and the determination of whether the telematics device was correctly installed can be further based on the telematics data received from the telematics device.

In some embodiments, the telematics data can include acceleration data.

In some embodiments, the telematics data can include device fault data.

In some embodiments, the telematics data can include ignition data.

In some embodiments, the at least one processor can: display, at a computing device associated with an installer, a request for the image data.

In some embodiments, the at least one action can include: displaying, at a computing device associated with an installer, an alert that the telematics device was not correctly installed.

In some embodiments, the at least one action can include: displaying, at the computing device associated with the installer, a request for second image data associated with the installation of the telematics device in the vehicle.

In some embodiments, the at least one action can include, in response to determining the telematics device was not correctly installed: receiving second image data associated with a second installation of the telematics device in a vehicle; extracting a portion of the second image data containing the telematics device using the first machine learning model; and determining that the telematics device was correctly installed using the second machine learning model on the extracted portion of the second image data.

In some embodiments, the image data can include a plurality of images and at least some of the images in the plurality of images may not contain the telematics device.

In some embodiments, the at least one action can include: determining that the telematics device is associated with a return merchandise authorization request; and denying the return merchandise authorization request based on the determination that the telematics device was not correctly installed.

In some embodiments, the at least one processor can: receive telematics data from a plurality of telematics devices including the telematics device; and the at least one action can include in response to determining that the telematics device was not installed correctly, processing the telematics data excluding telematics data received from the telematics device.

In some embodiments, the at least one action can include: storing an indication that the telematics device was not correctly installed in at least one data storage.

In some embodiments, the at least one action can include: displaying, at a computing device associated with an installer, a request to confirm whether the telematics device was installed correctly; receiving feedback data from the computing device indicating whether the telematics device was installed correctly; and retraining the first and/or second machine learning model based on the feedback data.

BRIEF DESCRIPTION OF THE DRAWINGS

Several embodiments will be described in detail with reference to the drawings, in which.

Figure 1:
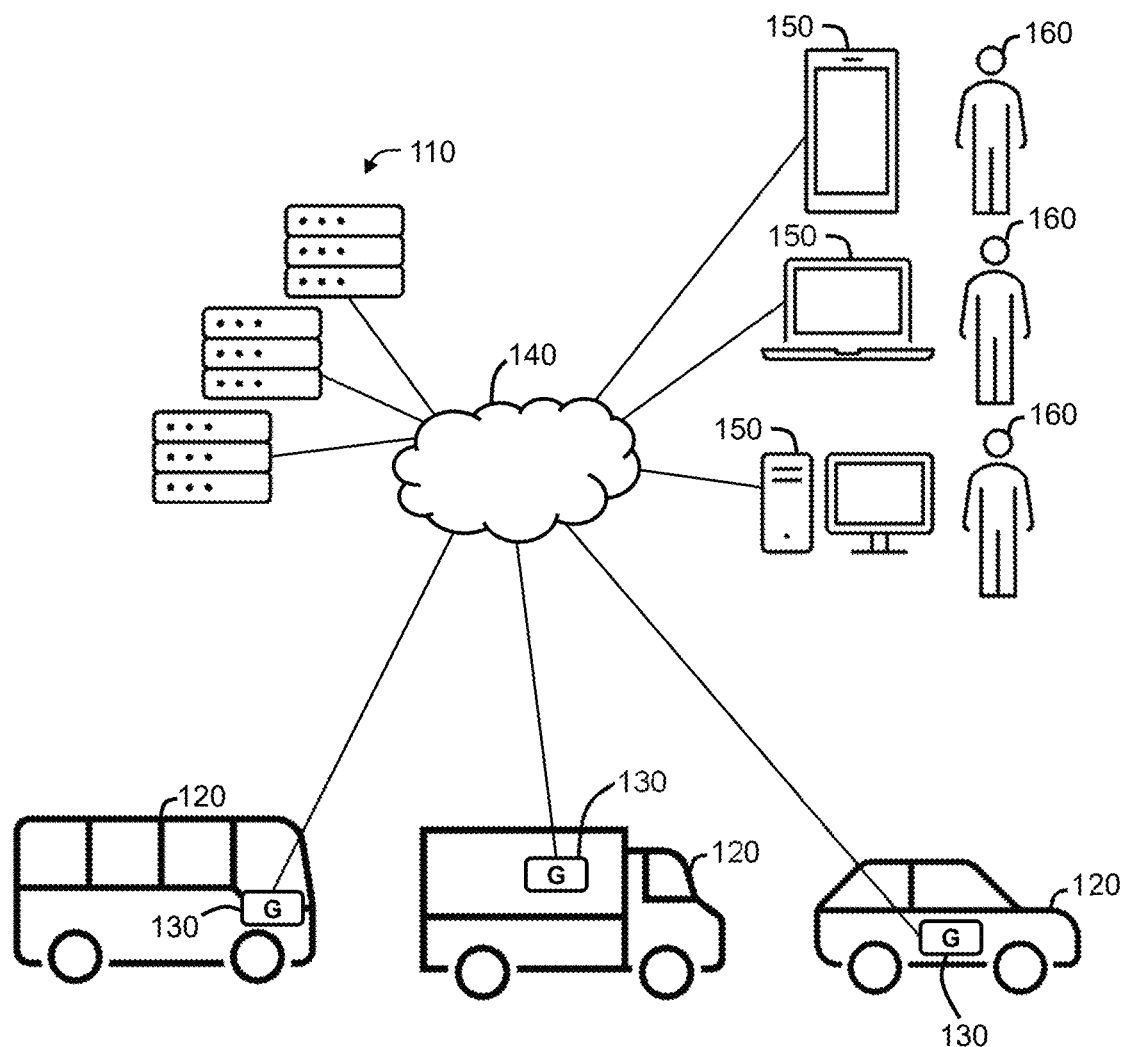
FIG. 1 is a block diagram of various components interacting with an example fleet management system, in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DETAILED DESCRIPTION

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Referring to FIG. 1, there is shown an example asset management system 110 for managing a plurality of assets equipped with a plurality of telematics devices 130. In operation, the telematics devices 130 can gather various data associated with the assets (i.e., telematics data) and share the telematics data with the asset management system 110. The asset management system 110 can process the telematics data to generate various insights relating to the assets. The asset management system 110 can be remotely located from the telematics devices 130 and the assets.

For ease of exposition, various examples will now be described in which the assets are vehicles 120 and the asset management system 110 is referred to as a fleet management system 110. However, it should be appreciated that the systems and methods described herein may be used to manage other forms of assets in some embodiments. Such assets can generally include any apparatuses, articles, machines, and/or equipment that can be equipped and monitored by the telematics devices 130. For example, other assets may include shipping containers, trailers, construction equipment, generators, and the like. The nature and format of the telematics data may vary depending on the type of asset.

The vehicles 120 may include any machines for transporting goods or people. The vehicles 120 can include motor vehicles, such as, but not limited to, motorcycles, cars, trucks, and/or buses. The motor vehicles can be gas, diesel, electric, hybrid, and/or alternative fuel. In some cases, the vehicles 120 may include other kinds of vehicles, such as, but not limited to, railed vehicles (e.g., trains, trams), watercraft (e.g., ships, boats), aircraft (e.g., airplanes, helicopters), and/or spacecraft. Each vehicle 120 can be equipped with a telematics device 130. Although only three vehicles 120 having three telematics devices 130 are shown in the illustrated example for ease of illustration, it should be appreciated that there can be any number of vehicles 120 and telematics devices 130. In some cases, the fleet management system 110 may manage hundreds, thousands, or even millions of vehicles 120 and telematics devices 130.

The telematics devices 130 can be standalone devices that are removably installed in the vehicles 120, such as, but not limited to, vehicle tracking devices. Alternatively, the telematics devices 130 can be integrated or embedded components that are integral with the vehicles 120, such as, but not limited to, telematic control units (TCUs). The telematics devices 130 can gather various telematics data from the vehicles 120 and share the telematics data with the fleet management system 110. The telematics data may include any information, parameters, attributes, characteristics, and/or features associated with the vehicles 120. For example, the telematics data can include, but is not limited to, location data, speed data, acceleration data, engine data, brake data, transmission data, fluid data (e.g., oil, coolant, and/or washer fluid), energy data (e.g., battery and/or fuel level), odometer data, vehicle identifying data, error/diagnostic data, tire pressure data, seatbelt data, and/or airbag data. In some cases, the telematics data may include information related to the telematics devices 130 and/or other devices associated with the telematics devices 130.

The fleet management system 110 can process the telematics data collected from the telematics devices 130 to provide various analysis, predictions, reporting, and alerts. For example, the fleet management system 110 can process the telematics data to gain additional information regarding the vehicles 120, such as, but not limited to, trip distances/times, idling times, harsh braking/driving, usage rate, and/or fuel economy. Various data analytics and machine learning techniques may be used by the fleet management system 110 to process the telematics data. The telematics data can then be used to manage various aspects of the vehicles 120, such as, but not limited to, route planning, vehicle maintenance, driver compliance, asset utilization, and/or fuel management. In this manner, the fleet management system 110 can improve the productivity, efficiency, safety, and/or sustainability of the vehicles 120.

A plurality of computing devices 150 can provide access to the fleet management system 110 to a plurality of users 160. This may allow the users 160 to manage and track the vehicles 120, for example, using various telematics data collected and/or processed by the fleet management system 110. The computing devices 150 can be any computers, such as, but not limited to, personal computers, portable computers, wearable computers, workstations, desktops, laptops, smartphones, tablets, smartwatches, PDAs (personal digital assistants), and/or mobile devices. The computing devices 150 can be remotely located from the fleet management system 110, telematics devices 130, and vehicles 120. Although only three computing devices 150 operated by three users 160 are shown in the illustrated example for ease of illustration, it should be appreciated that there can be any number of computing devices 150 and users 160. In some cases, the fleet management system 110 may service hundreds, thousands, or even millions of computing devices 150 and users 160.

The fleet management system 110, telematics devices 130, and computing devices 150 can communicate through one or more networks 140. The networks 140 may be wireless, wired, or a combination thereof. The networks 140 may employ any communication protocol and utilize any communication medium. For example, the networks 140 may include, but is not limited to, Wi-Fi™ networks, Ethernet networks, Bluetooth™ networks, NFC (near-field communication) networks, radio networks, cellular networks, and/or satellite networks. The networks 140 may be private, public, or a combination thereof. For example, the networks 140 may include, but is not limited to, LANs (local area networks), WANs (wide area networks), and/or the Internet. The networks 140 may also facilitate communication with other devices and systems that are not shown.

The fleet management system 110 can be implemented using one or more computers. For example, the fleet management system 110 may be implemented using one or more computer servers. The servers can be distributed across a wide geographical area. In some embodiments, the fleet management system 110 may be implemented using virtual machines and/or a cloud computing platform, such as Google Cloud Platform™ or Amazon Web Services™. In other embodiments, the fleet management system 110 may be implemented using one or more dedicated computer servers.

Figure 2:
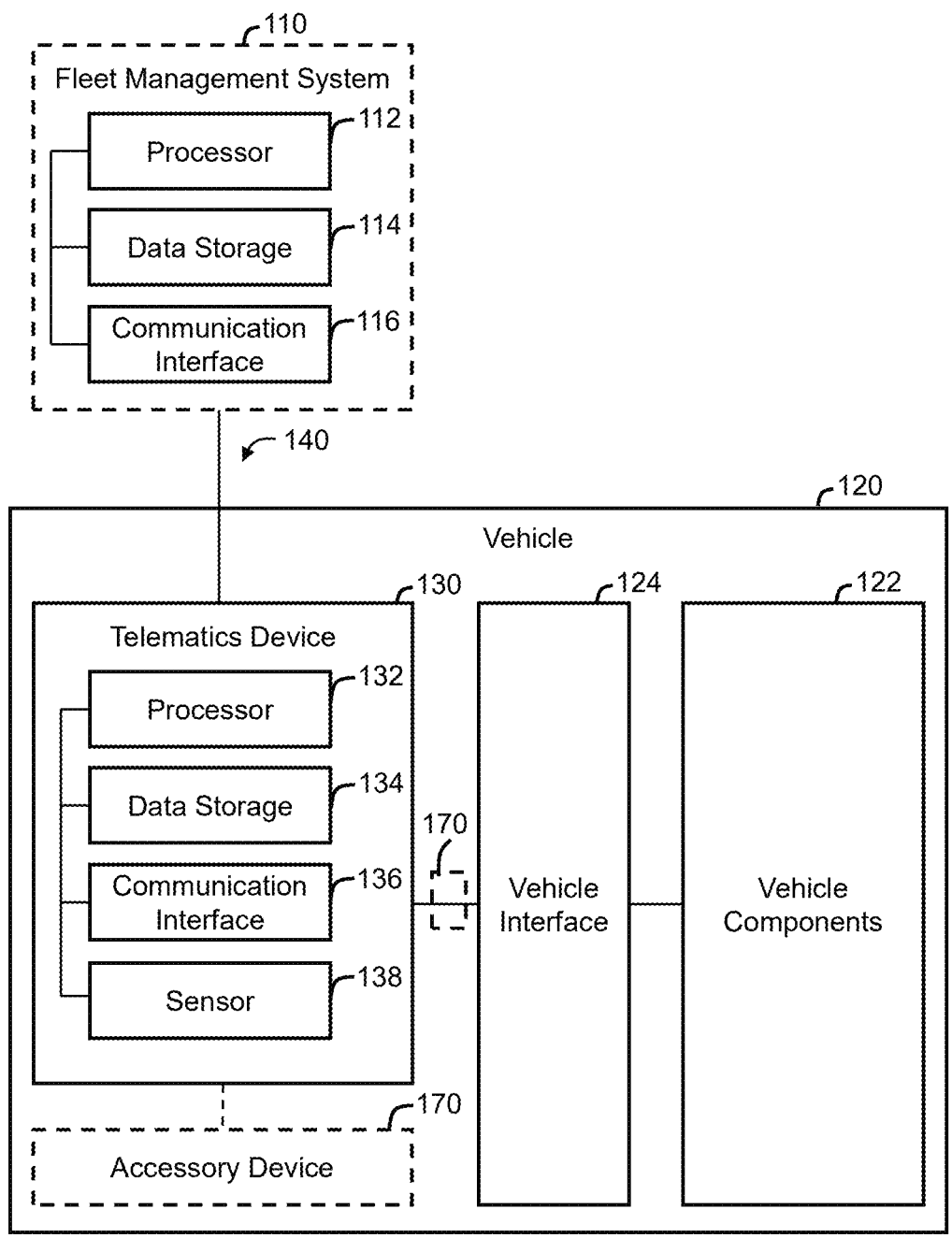
FIG. 2 is a block diagram of an example fleet management system interacting with an example telematics device and example vehicle, in accordance with an embodiment.

Reference will now be made to FIG. 2 to further explain the operation of the fleet management system 110, telematics devices 130, and vehicles 120. In the illustrated example, the fleet management system 110 is in communication with a telematics device 130 that is installed in a vehicle 120.

As shown, the fleet management system 110 can include one or more processors 112, one or more data storages 114, and one or more communication interfaces 116. Each of these components may communicate with each other. Each of these components may be combined into fewer components or divided into additional subcomponents. Two or more of these components and/or subcomponents may be distributed across a wide geographical area.

The processors 112 can control the operation of the fleet management system 110. The processors 112 can be implemented using any suitable processing devices or systems, such as, but not limited to, CPUs (central processing units), GPUs (graphics processing units), FPGAs, (field programmable gate arrays), ASICs (application specific integrated circuits), DSPs (digital signal processors), NPUs (neural processing units), QPUs (quantum processing units), microprocessors, and/or controllers. The processors 112 can execute various computer instructions, programs, and/or software stored on the data storages 114 to implement various methods described herein. For example, the processors 112 may process various telematics data collected by the fleet management system 110 from the telematics device 130.

The data storages 114 can store various data for the fleet management system 110. The data storages 114 can be implemented using any suitable data storage devices or systems, such as, but not limited to, RAM (random access memory), ROM (read only memory), flash memory, HDD (hard disk drives), SSD (solid-state drives), magnetic tape drives, optical disc drives, and/or memory cards. The data storages 114 may include volatile memory, non-volatile memory, or a combination thereof. The data storages 114 may include non-transitory computer readable media. The data storages 114 can store various computer instructions, programs, and/or software that can be executed by the processors 112 to implement various methods described herein. The data storages 114 may store various telematics data collected from the telematics device 130 and/or processed by the processors 112.

The communication interfaces 116 can enable communication between the fleet management system 110 and other devices or systems, such as the telematics device 130. The communication interfaces 116 can be implemented using any suitable communication devices or systems. For example, the communication interfaces 116 may include various physical connectors, ports, or terminals, such as, but not limited to, USB (universal serial bus), Ethernet, Thunderbolt, Firewire, SATA (serial advanced technology attachment), PCI (peripheral component interconnect), HDMI (high-definition multimedia interface), and/or DisplayPort. The communication interfaces 116 can also include various wireless interface components to connect to wireless networks, such as, but not limited to, Wi-Fi™, Bluetooth™, NFC, cellular, and/or satellite. The communication interfaces 116 can enable various inputs and outputs to be received at and sent from the fleet management system 110. For example, the communication interfaces 116 may be used to retrieve telematics data from the telematics device 130.

As shown, the telematics device 130 also can include one or more processors 132, one or more data storages 134, and one or more communication interfaces 136. Additionally, the telematics device 130 can include one or more sensors 138. Each of these components may communicate with each other. Each of these components may be combined into fewer components or divided into additional subcomponents.

The processors 132 can control the operation of the telematics device 130. Like the processors 112 of the fleet management system 110, the processors 132 of the telematics device 130 can be implemented using any suitable processing devices or systems. The processors 132 can execute various computer instructions, programs, and/or software stored on the data storages 134. For example, the processors 132 can process various telematics data gathered from the vehicle components 122 or the sensors 138.

The data storages 134 can store various data for the telematics device 130. Like the data storages 114 of the fleet management system 110, the data storages 134 of the telematics device 130 can be implemented using any suitable data storage devices or systems. The data storages 134 can store various computer instructions, programs, and/or software that can be executed by the processors 132. The data storages 134 can also store various telematics data gathered from the vehicle components 122 or the sensors 138.

The communication interfaces 136 can enable communication between the telematics device 130 and other devices or systems, such as the fleet management system 110 and vehicle components 122. Like the communication interfaces 116 of the fleet management system 110, the communication interfaces 136 of the telematics device 130 can be implemented using any suitable communication devices or systems. The communication interfaces 136 can enable various inputs and outputs to be received at and sent from the telematics device 130. For example, the communication interfaces 136 may be used collect telematics data from the vehicle components 122 and sensors 138 or to send telematics data to the fleet management system 110. The communication interfaces 136 can also be used to connect the telematics device 130 with one or more accessory devices 170.

The sensors 138 can detect and/or measure various environmental events and/or changes. The sensors 138 can include any suitable sensing devices or systems, including, but not limited to, location sensors, velocity sensors, acceleration sensors, orientation sensors, vibration sensors, proximity sensors, temperature sensors, humidity sensors, pressure sensors, optical sensors, and/or audio sensors. When the telematics device 130 is installed in the vehicle 120, the sensor 138 can be used to gather telematics data that may not be obtainable from the vehicle components 122. For example, the sensors 138 may include a satellite navigation device, such as, but not limited to, a GPS (global positioning system) receiver, which can measure the location of the vehicle 120. As another example, the sensor 138 may include accelerometers, gyroscopes, magnetometers, and/or IMUs (inertial measurement units), which can measure the acceleration and/or orientation of the vehicle 120.

In some cases, the telematics device 130 may operate in conjunction with one or more accessory devices 170 that are in communication with the telematics device 130. The accessory devices 170 can include expansion devices that can provide additional functionality to the telematics device 130. For example, the accessory devices 170 may provide additional processing, storage, communication, and/or sensing functionality through one or more additional processors, data storages, communication interfaces, and/or sensors (not shown). The accessory devices 170 can also include adapter devices that facilitate communication between the communication interface 136 and the vehicle interfaces 124, such as a cable harness.

The telematics device 130 can be installed within the vehicle 120, removably or integrally. One or more accessory devices 170 can also be installed in the vehicle 120 along with the telematics device 130. As shown, the vehicle 120 can include one or more vehicle components 122 and one or more vehicle interfaces 124. Each of these components may be combined into fewer components or divided into additional subcomponents.

The vehicle components 122 can include any subsystems, parts, and/or subcomponents of the vehicle 120. The vehicle components 122 can be used to operate and/or control the vehicle 120. For example, the vehicle components 122 can include, but are not limited to, powertrains, engines, transmissions, steering, braking, seating, batteries, doors, and/or suspensions. The telematics device 130 can gather various telematics data from the vehicle components 122. For example, the telematics device 130 may communicate with one or more ECUs (electronic control units) that control the vehicle components 122 and/or one or more internal vehicle sensors.

The vehicle interfaces 124 can facilitate communication between the vehicle components 122 and other devices or systems. The vehicle interfaces 124 can include any suitable communication devices or systems. For example, the vehicle interfaces 124 may include, but is not limited to, OBD-II (on-board diagnostics 2) ports, CAN (controller area network) bus connectors, proprietary or manufacturer-specific connectors, commercial or heavy-duty diagnostics connectors (e.g., J1708, J1939, etc.), etc. The vehicle interfaces 124 can be used by the telematics device 130 to gather telematics data from the vehicle components 122. For example, a communication interface 136 of the telematics device 130 can be connected to a vehicle interface 124 to communicate with the vehicle components 122. In some cases, an accessory device 170, such as a cable harness, can provide the connection between the communication interface 136 and the vehicle interface 124.

Figure 3:
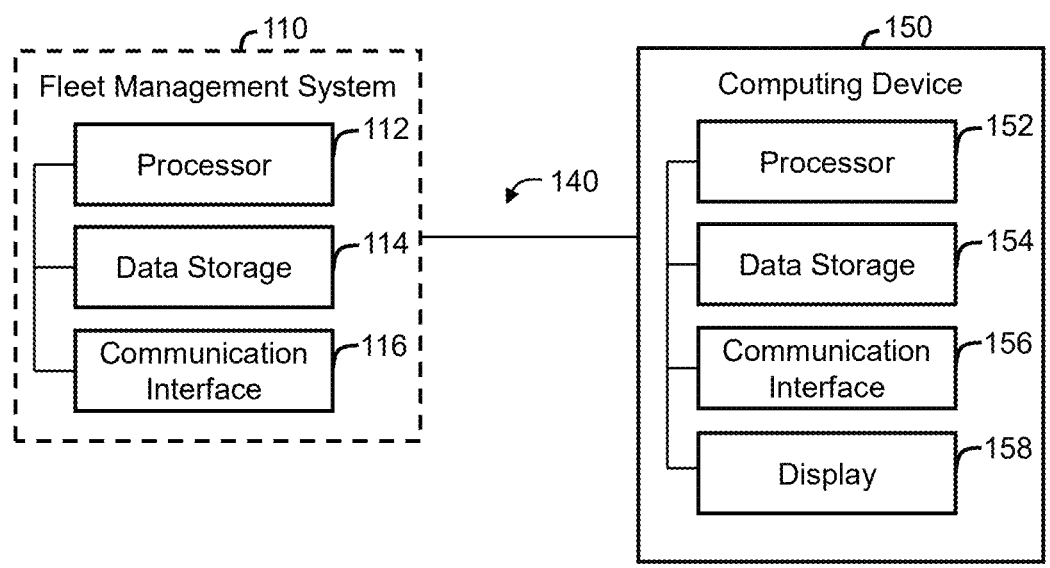
FIG. 3 is a block diagram of an example computing device interacting with an example fleet management system, in accordance with an embodiment.

Reference will now be made to FIG. 3 to further explain the operation of the fleet management system 110 and computing devices 150. In the illustrated example, the fleet management system 110 is in communication with a computing device 150. As shown, the computing device 150 also can include one or more processors 152, one or more data storages 154, and one or more communication interfaces 156. Additionally, the computing device 150 can include one or more displays 158. Each of these components can communicate with each other. Each of these components may be combined into fewer components or divided into additional subcomponents.

The processors 152 can control the operation of the computing device 150. Like the processors 112 of the fleet management system 110 and the processors 132 of the telematics device 130, the processors 152 of the computing device 150 can be implemented using any suitable processing devices or systems. The processors 152 can execute various computer instructions, programs, and/or software stored on the data storages 154 to implement various methods described herein. For example, the processors 152 may process various telematics data received from the fleet management system 110 and/or the telematics device 130.

The data storages 154 can store various data for the computing device 150. Like the data storages 114 of the fleet management system 110 and the data storages 134 of the telematics device 130, the data storages 154 of the computing device 150 can be implemented using any suitable data storage devices or systems. The data storages 154 can store various computer instructions, programs, and/or software that can be executed by the processor 152 to implement various methods described herein. The data storages 154 may store various telematics data received from the fleet management system 110 and/or the telematics device 130.

The communication interfaces 156 can enable communication between the computing device 150 and other devices or systems, such as the fleet management system 110. Like the communication interfaces 116 of the fleet management system 110 and the communication interfaces 136 of the telematics device 130, the communication interfaces 156 of the computing device 150 can be implemented using any suitable communication devices or systems. The communication interfaces 156 can enable various inputs and outputs to be received at and sent from the computing device 150. For example, the communication interfaces 116 may be used to retrieve telematics data from the fleet management system 110.

The displays 158 can visually present various data for the computing device 150. The displays 158 can be implemented using any suitable display devices or systems, such as, but not limited to, LED (light-emitting diode) displays, LCDs (liquid crystal displays), ELDs (electroluminescent displays), plasma displays, quantum dot displays, and/or cathode ray tube (CRT) displays. The displays 158 can be an integrated component that is integral with the computing device 150 or a standalone device that is removably connected to the computing device 150. The displays 158 can present various user interfaces for various computer applications, programs, and/or software associated with various methods described herein. For example, the displays 158 may display various visual representations of the telematics data.

Figure 4A:
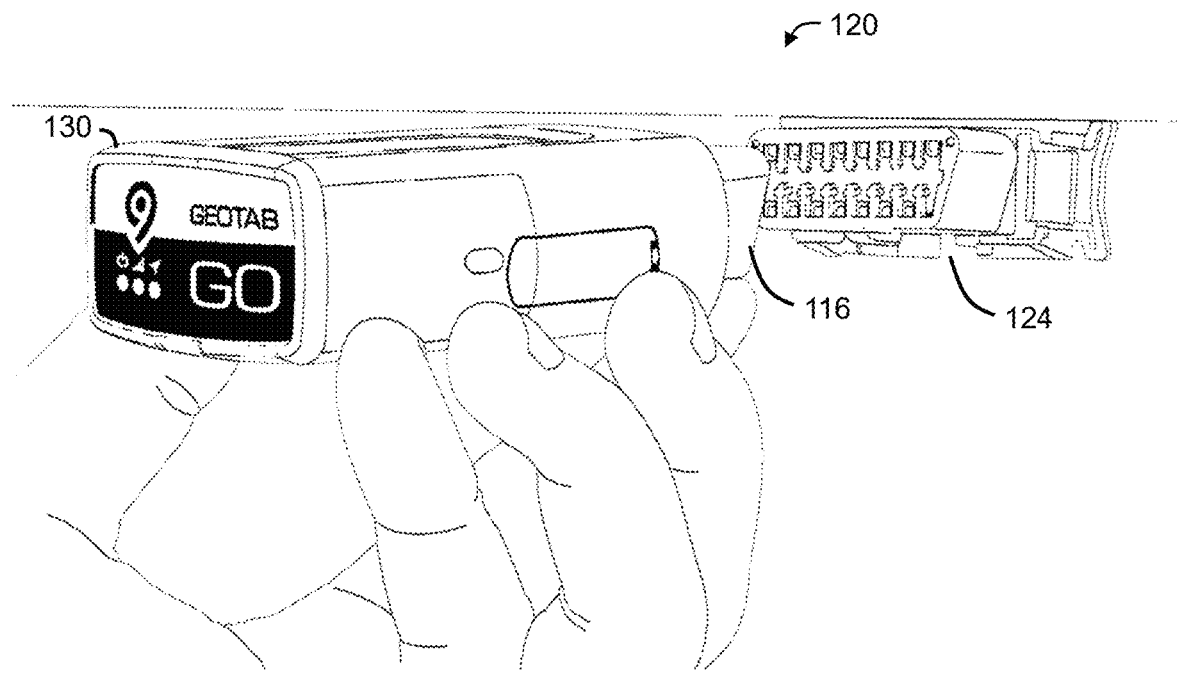
FIG. 4A is a perspective view of an example telematics device being installed in a vehicle, in accordance with an embodiment.
Figure 4B:
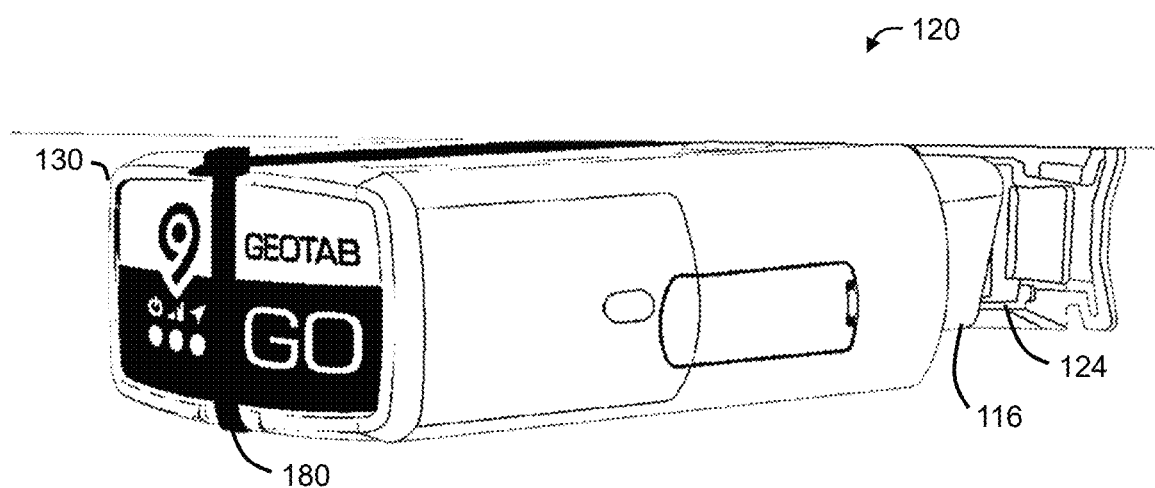
FIG. 4B is a perspective view of an example telematics device installed in a vehicle, in accordance with an embodiment.

Referring now to FIGS. 4A and 4B, there is shown an example installation of a telematics device 130 in a vehicle

120. As shown, the telematics device 130 can be installed by connecting the communication interface 116 of the telematics device 130 to the vehicle interface 124 of the vehicle 120. This connection can enable communication between the telematics device 130 and vehicle components 122 and allow the telematics device 130 to collect telematics data from the vehicle 120.

As shown, one or more fasteners 180 can be used during installation to physically secure, mount, fix, attach, or otherwise fasten the telematics device 130 to the vehicle 120. The fasteners 180 can also help maintain the connection between the communication interface 116 and the vehicle interface 124. In the illustrated example, a single fastener 180, which is a zip tie, fastens the telematics device 130 to the vehicle interface 124. However, it should be appreciated that the fasteners 180 may be attached in various ways, including in different orientations and locations, and between different components. For example, the fasteners 180 may be attached to various parts of the vehicle 120. In some cases, the fasteners 180 may be attached to various components that are not part of the vehicle 120, such as, but not limited to, an accessory device 170. Any suitable number of fasteners 180 may be utilized, such as, but not limited to, one, two, three, four, five, or more. The fasteners 180 may be referred to as a first fastener 180, second fastener 180, third fastener 180, etc. Likewise, any type or combination of types of fasteners may be used, such as, but not limited to, straps, hook and loop strips, clips, latches, clamps, bolts, screws, etc. In some cases, one or more fasteners 180 may be integrated into the vehicle interface 124 and/or the communication interface 116.

In the illustrated example, the telematics device 130 is directly installed into the vehicle interface 124. That is, the communication interface 116 of the telematics device 130 is connected directly to the vehicle interface 124. However, it should be appreciated that the telematics device 130 can be installed in other configurations.

Figure 5A:
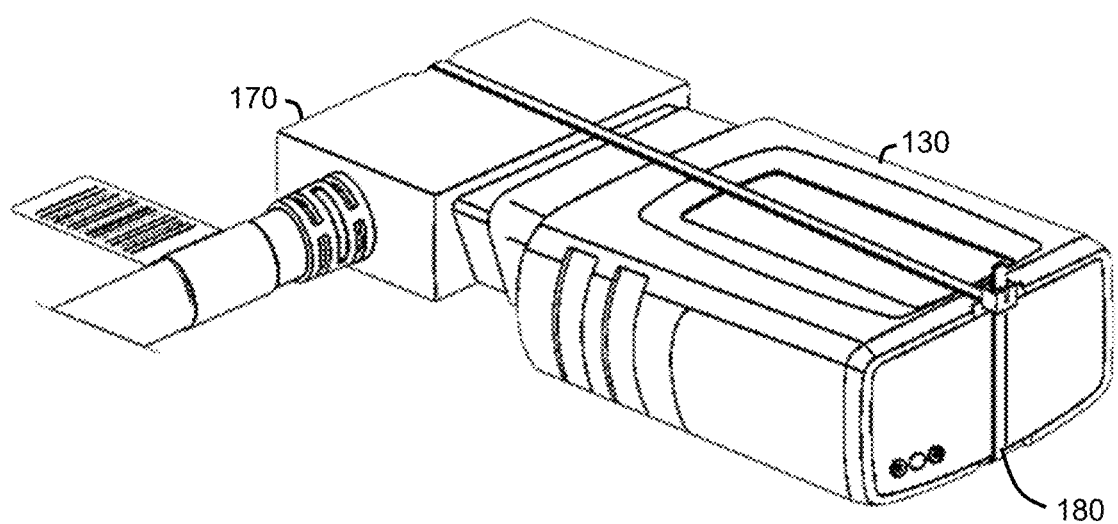
FIG. 5A is a perspective view of an example telematics device connected to a cable harness, in accordance with an embodiment.
Figure 5B:
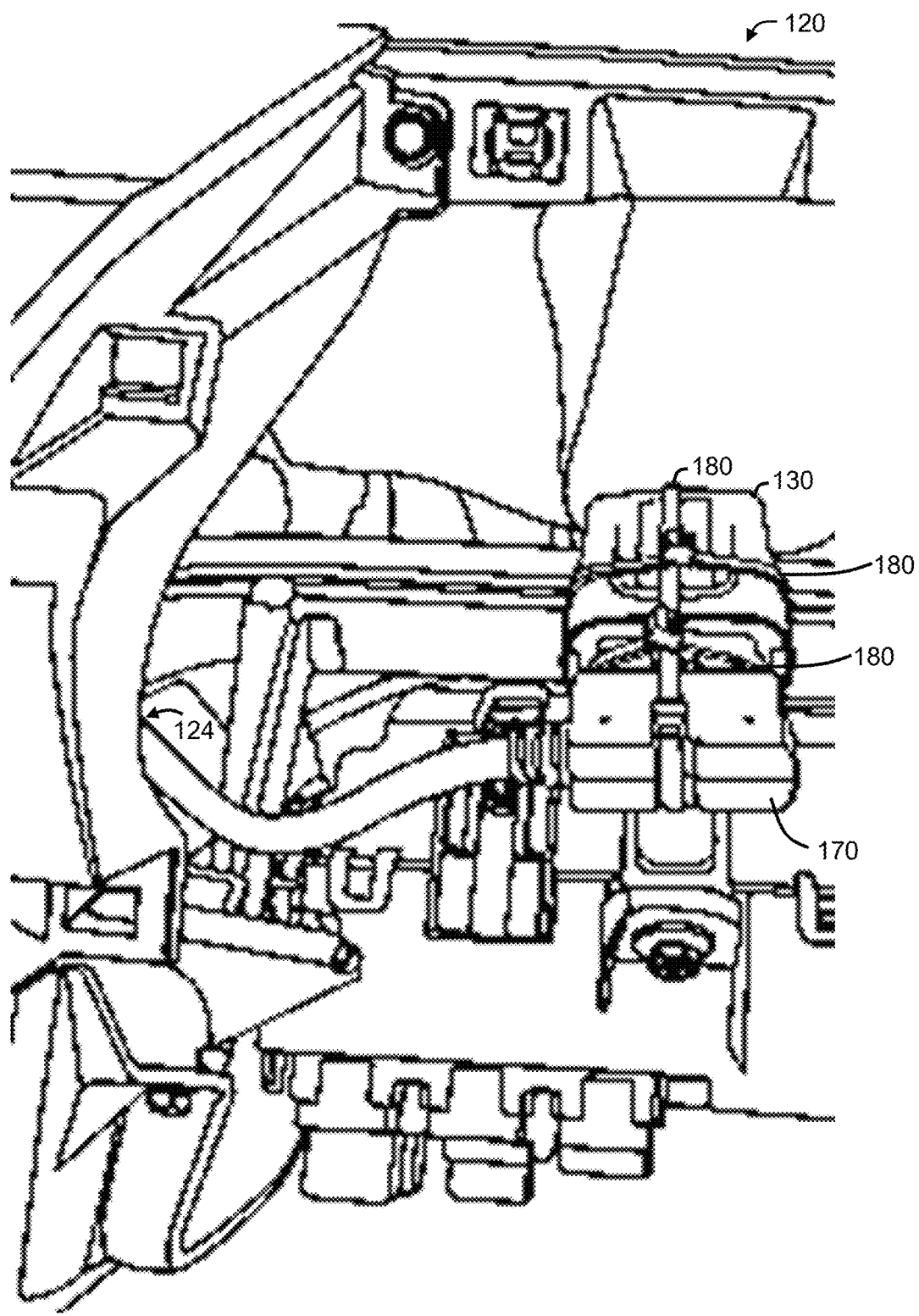
FIG. 5B is a perspective view of a telematics device installed in a vehicle using a cable harness, in accordance with an embodiment.

Referring to FIGS. 5A and 5B, there is shown another example installation of a telematics device 130 in a vehicle 120. In the illustrated example, the telematics device 130 is installed using a cable harness 170. As shown, the cable harness 170 can connect the communication interface 116 of the telematics device 130 to the vehicle interface 124 of the vehicle 120. In other words, the telematics device 130 can be indirectly connected to the vehicle interface 124 through the cable harness 170. This arrangement can allow the telematics device 130 to be positioned at various locations in the vehicle 120 away from the vehicle interface 124, while maintaining the connection between the telematics device 130 and vehicle components 122, permitting communication therebetween, and collection of telematics data by the telematics device 130.

One or more fasteners 180 are also used in the example installation depicted in FIGS. 5A and 5B. In the illustrated example, a first fastener 180, which is a zip tie, fastens the telematics device 130 to the cable harness 170, maintaining the connection between the communication interface 116 and vehicle interface 124 through the cable harness 170. Additionally, second and third fasteners 180, which are also zip ties, fasten the telematics device 130 to the vehicle 120, physically securing the telematics device 130 to the vehicle 120. As should be appreciated, other numbers and types of fasteners 180 can be utilized. Likewise, the fasteners 180 can be attached in other ways, including in different locations and orientations, and between different components. In some cases, one or more fasteners 180 may physically secure the cable harness 170 to the vehicle 120. In some cases, one or more fasteners 180 may be used to maintain the connection between the cable harness 170 and the vehicle interface 124. In some cases, one or more fasteners 180 may be integrated into the cable harness 170, communication interface 116, and/or vehicle interface 124.

In the examples illustrated in FIGS. 4A, 4B, 5A, and 5B, the vehicle interface 124 is an OBD-II port. However, the vehicle interface 124 can be any suitable port, connector, and/or interface. For example, the vehicle interface 124 may be a CAN bus connector, a proprietary or manufacturer-specific connector, a commercial or heavy-duty diagnostics connector, etc.

Numerous problems can occur if a telematics device 130 is not installed in a vehicle 120 properly. The inventors recognized and realized that many problems misattributed to faulty telematics devices 130 stem from improper, incorrect, or bad installations of properly functioning devices. Bad installations can degrade device performance, cause devices to malfunction, or even lead to device failure. For example, failure to adequately physically secure a telematics device 130 can result in vibrations and movement unrelated to the acceleration of the vehicle 120, leading to inaccurate acceleration readings. Likewise, a faulty connection of a telematics device 130 to a vehicle interface 124 and/or cable harness 170 can interrupt the flow of data and/or power, causing data loss and/or device malfunction. Similarly, improper positioning of a telematics device 130 can degrade GPS and/or cellular signal quality, leading to inaccurate and incomplete data. In other words, bad installations can negatively affect the operation of otherwise properly functioning telematics devices 130 in many ways.

As a result, bad installations can result in unnecessary support requests, warrantee claims, device returns, and service cancellations of telematics devices 130 in otherwise good working order. Significant time, effort, and expense is often spent to investigate purported device issues, offer customer support, repair and/or replace devices, and maintain customer satisfaction. The inventors recognized and realized that proactively identifying bad installations could save significant time, effort, and expense.

However, troubleshooting telematics device 130 installations can be very difficult. Previous approaches have typically involved physically inspecting the installed telematics devices 130. However, it is often challenging to obtain access to the vehicles 120 in which the telematics devices 130 have been installed. Instead, the process can involve manually analyzing images of the installation and remotely working with an end user. The problem with these manual approaches is that they are extremely time consuming and rely on a high degree of skill and training. Moreover, even if a bad installation is detected, manually troubleshooting the problem with the installation can be burdensome.

The inventors realized and recognized that computer-implemented systems and methods that automate detection of bad telematics device installations could ameliorate at least some of these problems. In particular, they realized and recognized that one or more computer-implemented machine learning models could be trained to detect bad installations at a high degree of speed and accuracy that would otherwise not be possible using manual techniques. The inventors recognized and realized that various artificial intelligence techniques could be used to train models to detect bad installations without explicitly programing them to do so.

The inventors recognized and realized that computer-implemented machine learning models could offer several advantages over manual inspection or review. For example, machine learning models can enable near real-time analysis by automatically processing images at significantly higher speeds than humans. Machine learning models can also handle larger numbers of images that would otherwise be too time consuming for humans to review. Machine learning models can also apply consistent logic, eliminating human judgement, ensuring consistent results, and minimizing human bias. Similarly, machine learning models can provide precise quantitative measurements and detect subtle patterns that might otherwise be missed by humans, leading to higher accuracy and precision. Furthermore, machine learning models can be implemented in remote locations and provide continuous operation, enabling analysis of otherwise inaccessible environments. Machine learning models can also be retrained to adapt to new conditions or different requirements. Finally, machine learning models can reduce the need for human resources and save significant cost.

Figure 6A:
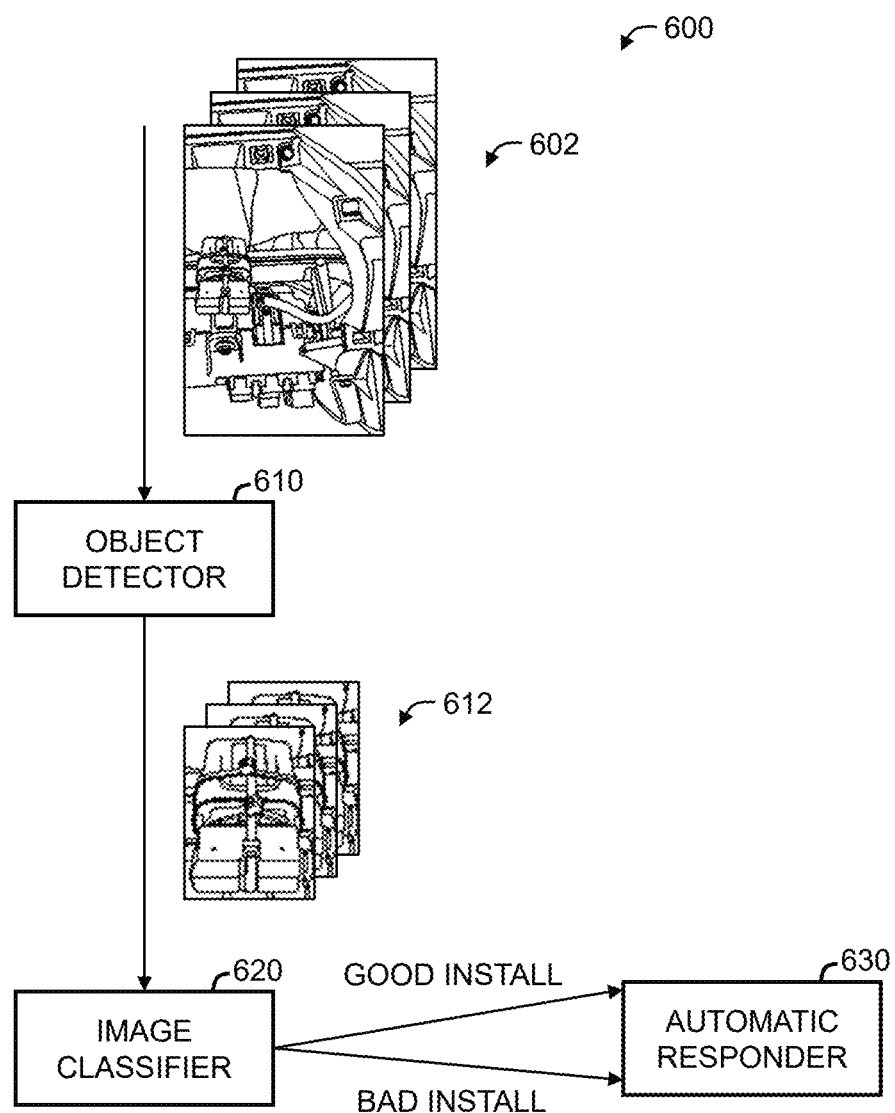
FIG. 6A is a block diagram of an example system for detecting bad telematics device installations, in accordance with an embodiment.

Referring to FIG. 6A, there is shown an example system 600 for detecting bad telematics device installations. The bad installation detection system 600 can use one or more computer-implemented machine learning models to detect bad telematics device installations based on one or more images of the installation. More specifically, the bad installation detection system 600 can receive image data 602 associated with telematics device installations, detect and extract portions 612 of the image data 602 containing telematics devices 130, and classify and determine whether the installations are bad. The bad installation detection system 600 can provide various advantages described herein, including, but not limited to, speed, efficiency, consistency, reliability, accuracy, precision, scalability, accessibility, etc. The bad installation detection system 600 can be implemented by the fleet management system 110 (e.g., by at least one processor 112 executing instructions stored on at least one data storage 114), one or more computing devices 150 (e.g., by at least one processor 152 executing instructions stored on at least one data storage 154), or a combination thereof.

As shown, the bad installation detection system 600 can include an object detector 610, an image classifier 620, and an automatic responder 630. Each of these components may communicate with each other. Each of these components may be combined into fewer components or divided into additional subcomponents. The object detector 610, image classifier 620, and automatic responder 630 can be implemented by any of the one or more processors 112, 152 executing instructions stored on any of the one or more data storages 114, 154.

In operation, the object detector 610 can receive image data 602 associated with an installation of a telematics device 130 in a vehicle 120. The object detector 610 can detect the telematics device 130 in the image data 602 and extract a portion 612 of the image data 602 containing the telematics device 130. The image classifier 620 can determine whether the telematics device 130 was correctly installed by classifying the telematics device 130 in the extracted image data 612 based on whether at least one fastener 180 is attached to the telematics device 130. The automatic responder 630 can automatically execute one or more actions in response to the determination and based on whether the telematics device 130 was correctly installed.

The object detector 610 can include a computer-implemented machine learning model, which can be referred to as first machine learning model. The first machine learning model can be trained to detect telematics devices 130 in image data 602 associated with telematics device installations. In operation, the first machine learning model can define portions 612 of the image data 602 containing a telematics device 130 which can be extracted by the object detector 610. For example, the first machine learning model may define a bounding box surrounding a telematics device 130 in the image data 602 that can be extracted or cropped by the object detector 610.

The first machine learning model can detect telematics devices 130 in the image data 602 by extracting various features in the image data 602 and performing various analysis on the features to identify and locate telematics devices 130 in the image data 602. The features and analysis performed by the first machine learn model can vary depending on the type of model and training used to create the model. The first machine learning model can extract and analyze various image features to detect telematics devices 130, such as, but not limited to, edges, corners, blobs, ridges shapes, colors, etc. For example, the first machine learning model may identify boundaries through edge detection, locate key points using corner detection, and/or use shape descriptors or color analysis to categorize and locate telematics devices 130 and/or other objects in the image data 602. This can involve defining bounding boxes surrounding the telematics devices 130 and/or other objects in the image data 602.

The image data 602 can include various electronic images associated with installations of telematics devices 130. For example, the image data 602 may include image files depicting telematics devices 130 installed within vehicles 120, such as, but not limited to, the example views shown in FIGS. 4B, 5B, and 8A-8J. The image data 602 may include image depicting telematics devices 130 in various positions and from different perspectives, including, but not limited to, different angles, distances, orientations, etc. The object detector 610 can use the first machine learning model to detect, locate, and extract telematics devices 130 from a variety of different images. In some cases, the image data 602 may include other images associated with the installation that do not depict a telematics device 130. For example, one or more images may depict all or part of a vehicle 120, without depicting a telematics device 130. The object detector 610 can use the first machine learning model to determine that these images do not contain a telematics device 130.

The image data 602 can be received and processed in various computer file formats, such as, but not limited to, JPEG (Joint Photographic Experts Group), PNG (Portable Network Graphics), GIF (Graphics Interchange Format), etc. For example, the image data 602 may include one or more digital arrays of values that represent color and/or intensity. In general, the image data 602 can include any digital representation of a visual scene related to a telematics device installation that exists in a computer format and can be stored and manipulated electronically. The image data 602 may originate from various sources, including, but not limited to installers uploading image files as evidence of installations, customers submitting image files when requesting technical support, etc.

In various embodiments, the first machine learning model can include a convolutional neural network. The inventors recognized and realized that convolutional neural networks could provide several advantages over other types of machine learning models. For example, convolutional neural networks can provide automatic feature extraction, eliminating the need for manual feature engineering. Another advantage of convolutional neural networks is that they can be spatial invariant, enabling detection of objects at various scales and orientations. Likewise, convolutional neural networks can possess better parameter efficiency than other types of models, requiring fewer model parameters to achieve the same performance. Additionally, convolutional neural networks can provide significantly higher accuracy for object detection than other types of models.

In some embodiments, the convolutional neural network can be implemented as part of a YOLO (You Only Look Once) algorithm. That is, the object detector 610 can execute a YOLO algorithm that uses a convolutional neural network. For example, the YOLO algorithm can divide the image data 602 into a grid and use a convolutional neural network to predict bounding boxes and classifications for objects within each grid cell. An advantage of a YOLO algorithm is that it can be faster to execute than other object detection algorithms, while maintaining accuracy and precision, because detection is performed using a single pass through the neural network, instead of using multiple stages. Various versions of YOLO algorithms may be used, such as, but not limited to, YOLO, YOLOv2, YOLOv3, YOLOv4, YOLOv5, YOLOV6, YOLOV7, YOLOV8, YOLO-NAS, YOLO-World, YOLOv9, YOLOv10, YOLOv11, etc. As well, different model sizes and complexities can be utilized. For example, YOLO11n (nano), a smaller and less complex model, may be used as the first machine learning model to maximize speed and efficiency, at the cost of accuracy. The inventors recognized and realized that a smaller and more computationally efficient model could provide sufficient accuracy for detecting telematics devices 130.

It should be appreciated that various object detection algorithms can be executed by the object detector 610 to detect telematics devices 130. For example, other object detection algorithms may include, but are not limited to, Retina-Net, R-CNN (Region-based Convolutional Neural Networks), Single Shot MultiBox Detector (SSD), YOLACT (You Only Look at Coefficients), SOLO (Segmenting Objects by Locations), etc. Likewise, the first machine learning model can include various other machine learning models, such as, but not limited to, artificial neural networks, decision trees, support-vector machines, nearest neighbors, linear regression, logistical regression, Bayesian networks, random forests, genetic algorithms, ensemble models, etc. The models may be trained using supervised, unsupervised, semi-supervised, reinforcement, or other types of learning. In general, the first machine learning model can be any computer-implemented model that is trained to detect a telematics device 130 in image data 602, without being explicitly programmed to do so.

The image classifier 620 can also include a computer-implemented machine learning model, which can be referred to as a second machine learning model. The second machine learning model can be trained to classify telematics devices 130 as correctly or incorrectly installed in extracted portions 612 of image data 602. It should be appreciated that the extracted portions 612 contain less data than the original image data 602. An advantage of processing the extracted image data 612, instead of processing all the image data 602, is that the volume of image data analyzed by the second machine learning model can be reduced. A smaller search space can reduce the amount and cost of hardware resources required to execute the second machine learning model. Furthermore, this can also reduce noise and unnecessary background information, which could otherwise confuse and reduce the accuracy of the second machine learning model.

The second machine learning model can classify telematics devices 130 based on one or more fasteners 180. This can involve extracting various features in the portions of image data 612 and performing various analysis on the features to identify and locate one or more fasteners 180 and/or other objects. The features and analysis performed by the second machine learning model can vary depending on the type of model and training used to create the model. The second machine learning model can extract and analyze various image features to detect the fasteners 180, such as, but not limited to, edges, corners, blobs, ridges shapes, colors, etc. For example, the second machine learning model may identify boundaries through edge detection, locate key points using corner detection, and/or use shape descriptors or color analysis to categorize and locate fasteners 180 and other objects in the extracted image data 612.

The inventors recognized and realized that various aspects, properties, attributes, or characteristics of the fasteners 180 could be used by the second machine learning model to determine whether a telematics device 130 is installed correctly. It should be appreciated that these features are different from what a human would consider when troubleshooting a telematics device installation. For example, a human could physically inspect the telematics device 130 by pulling on the telematics device 130 to verify its connection. If physical inspection is not possible, a human may visually inspect the telematics device 130, relying on spatial visual cues, such as the distance between the telematics device 130 and other objects, such as the vehicle 120, vehicle interface 124, and/or cable harness 170. However, the features that are typically relied on by humans are difficult for a machine learning model to discern. The inventors recognized and realized that various features of the fasteners 180, that would otherwise not be used by a human, could instead be used by machine learning models to accurately and efficiently classify telematics device installations. Various features of the fasteners 180 will now be described. It should be appreciated that the first machine learning model may use any combination of these features to determine whether a telematics device 130 is installed correctly.

In some embodiments, a telematics device 130 can be classified based on the number or quantity of fasteners 180 attached to the telematics device 130. In other words, the second machine learning model can determine how many fasteners 180 are attached to a telematics device 130. A large quantity of fasteners 180 can indicate that the telematics device 130 is more securely attached to the vehicle 120, vehicle interface 124, and/or cable harness 170. Likewise, a small number of fasteners 180 can indicate that the telematics device 130 is not securely attached to the vehicle 120, vehicle interface 124, and/or cable harness 170. The telematics device 130 can be classified as correctly installed if the number of fasteners 180 attached to the telematics device 130 meets or exceeds a predetermined minimum number of fasteners 180. Likewise, the telematics device 130 can be classified as incorrectly installed if there the number of fasteners 180 attached to the telematics device 130 is less than the predetermined minimum number of fasteners 180. For example, the second machine learning model can classify the telematics device 130 as correctly installed if at least one, two, three, or more fasteners 180 attached to the telematics device. Likewise, the second machine learning model can classify the telematics device 130 as incorrectly installed if less than one, two, three, or more fasteners 180 are attached to the telematics device 130.

Additionally, or alternatively, the telematics device 130 can be classified based on whether the fasteners 180 encircle the telematics device 130. That is, the second machine learning model can determine whether the fasteners 180 enclose, wrap around, or otherwise form loops around the telematics device 130. Fasteners 180 that encircle the telematics device 130 can suggest that the telematics device 130 is securely attached to the vehicle 120, vehicle interface 124, and/or cable harness 170. For example, the second machine learning model can classify the telematics device 130 as correctly installed if the fasteners 180 encircle the telematics device 130. Conversely, the second machine learning model can classify the telematics device 130 as incorrectly installed if the fasteners 180 do not encircle the telematics device 130.

Additionally, or alternatively, the telematics device 130 can be classified based on a position and orientation of the fasteners 180. For example, the second machine learning model can determine whether the fasteners 180 extend perpendicular or parallel to a longitudinal or transverse axis of the telematics device 130. Fasteners 180 that are positioned and/or oriented in such a manner can maximize contact with the telematics device 130 and reduce the risk of sliding off the telematics device 130. For example, the second machine learning model can classify the telematics device 130 as correctly installed if the fasteners 180 extend perpendicular or parallel to a longitudinal or transverse axis of the telematics device 130. Conversely, the second machine learning model can classify the telematics device 130 as incorrectly installed if the fasteners 180 do not extend perpendicular or parallel to a longitudinal or transverse axis of the telematics device 130.

Additionally, or alternatively, the second machine learning model can determine whether one or more fasteners 180 are perpendicular or parallel to a cable harness 170 and/or vehicle interface 124. A fastener 180 that is positioned and/or oriented in such a manner can indicate a secure connection between the telematics device and the cable harness 170 and/or vehicle interface 124, or a secure attachment of the telematics device 130 and the vehicle 120. For example, the second machine learning model can classify the telematics device 130 as correctly installed if the fasteners 180 are perpendicular or parallel to a cable harness 170. Conversely, the second machine learning model can classify the telematics device 130 as incorrectly installed if the fasteners 180 are not perpendicular or parallel to the cable harness 170.

Additionally, or alternatively, the second machine learning model can determine whether two or more fasteners 180 intersect or overlap. Intersecting fasteners 180 can generally provide more secure attachment compared to non-intersecting fasteners 180. For example, the second machine learning model can classify the telematics device 130 as correctly installed if first and second fasteners 180 intersect. Conversely, the second machine learning model can classify the telematics device 130 as an incorrectly installed if first and second fasteners 180 do not intersect.

Additionally, or alternatively, the second machine learning model can determine whether two or more fasteners 180 are perpendicular to each other. Fasteners that are perpendicular to each other can generally provide a more secure attachment and reduce the risk of the fasteners 180 sliding off. For example, the second machine learning model can classify the telematics device 130 as correctly installed if first and second fasteners 180 are perpendicular to each other. Conversely, the second machine learning model can classify the telematics device 130 as an incorrectly installed if the first and second fasteners 180 are not perpendicular to each other.

Additionally, or alternatively, the second machine learning model can determine whether two or more fasteners 180 intersect substantially in the middle of the telematics device 130. Fasteners 180 that intersect substantially at a center of the exterior of the telematics device 130 can generally provide a more secure attachment and reduce the risk of the fasteners 180 sliding off. For example, the second machine learning model can classify the telematics device 130 as correctly installed if first fastener and second fasteners 180 intersect substantially in the middle of the telematics device 130. Conversely, the second machine learning model can classify the telematics device 130 as incorrectly installed if the first and second fasteners 180 do not intersect substantially in the middle of the telematics device 130.

Additionally, or alternatively, the second machine learning model can classify the telematics device 130 based on a position and orientation of the telematics device 130. The position and orientation of a telematics device 130 can affect GPS (global positioning) and/or cellular signal quality. Certain positions and/or orientations may obstruct, interfere, or otherwise degrade these signals, leading to inaccurate and/or incomplete data. The telematics device 130 can be classified as correctly installed if the telematics devices 130 is disposed in a desired position and orientation. Conversely, the telematics devices 130 can be classified as incorrectly installed if the telematics devices 130 is disposed in an undesired position and orientation. For example, the second machine learning model can classify the telematics device 130 as correctly installed if a predetermined side of the telematics device 130 is substantially unobstructed. Conversely, the second machine learning model may classify the telematics device 130 as incorrectly installed if the predetermined side of the telematics device 130 is not substantially unobstructed. Additionally, or alternatively, the second machine learning model can classify the telematics device 130 as correctly installed if a predetermined side of the telematics device 130 substantially faces upward (i.e., perpendicular to the ground). Conversely, the second machine learning model can classify the telematics device 130 as incorrectly installed if the predetermined side of the telematics device 130 does not face upward.

Additionally, or alternatively, the telematics device 130 can be classified based on telematics data received from the telematics devices 130. The analysis of the telematics data can be executed by the second machine learning model or by another model. The telematics data can include, but is not limited to, acceleration data, ignition data, and/or device fault data.

Acceleration data can indicate whether the telematics device 130 is securely attached to the vehicle 120. If the telematics device 130 is not securely attached, the acceleration data can contain vibrations, sudden spikes, and other erroneous readings caused by unexpected movement of the telematics device 130. The telematics device 130 can be classified as correctly installed if the acceleration data does not contain anomalies, outliers, or other irregularities associated with an insecure or loose attachment. Conversely, the telematics device 130 can be classified as incorrectly installed if the acceleration data does contain anomalies, outliers, or other irregularities associated with an insecure or loose attachment.

Engine ignition data can indicate whether the telematics device 130 is in communication with the vehicle interface 124. If the telematics device is not properly connected, the telematics device 130 may fail to receive certain types of telematics data from the vehicle 120, including, but not limited to engine ignition data. The telematics device 130 can be classified based on whether particular telematics data is received. For example, the telematics device 130 can be classified as correctly installed if engine ignition data is received. Conversely, the telematics device 130 can be classified as incorrectly installed if engine ignition data is not received.

Device fault data can indicate whether the telematics device 130 is functioning correctly. Some device faults can indicate that the telematics device 130 is not installed correctly. For example, some device faults related to installation issues include, but are not limited to, loss of power, failure to receive data from the vehicle 120, low cellular and/or GPS signal quality, etc. The telematics device 130 can be classified based on a presence or absence of one or more faults in the device fault data. For example, the telematics device 130 can be classified as correctly installed if a particular device fault data is received. Conversely, the telematics device 130 can be classified as incorrectly installed if the particular device fault data is not received.

The second machine learning model can include the same or different types of machine learning models as the first machine learning model, including, but not limited to, a convolutional neural network. The convolutional neural networks may be implemented as part of a YOLO (You Only Look Once) algorithm, such as, but not limited to YOLO, YOLOv2, YOLOv3, YOLOv4, YOLOv5, YOLOv6, YOLOv7, YOLOv8, YOLO-NAS, YOLO-World, YOLOv9, YOLOv10, YOLOv11, etc. Various object detection algorithms can be executed by the image classifier 620, including, but are not limited to, Retina-Net, R-CNN (Region-based Convolutional Neural Networks), Single Shot MultiBox Detector (SSD), YOLACT (You Only Look at Coefficients), SOLO (Segmenting Objects by Locations), etc. Likewise, the second machine learning model can include other types of machine learning models, such as, but not limited to, artificial neural networks, decision trees, support-vector machines, nearest neighbors, linear regression, logistical regression, Bayesian networks, random forests, genetic algorithms, ensemble models, etc. The models may be trained using supervised, unsupervised, semi-supervised, reinforcement, or other types of learning. In general, the second machine learning model can include any model that is trained to classify a telematics device 130 in extracted image data 612, without being explicitly programmed to do so.

In various embodiments, the second machine learning model can be a different model than the first machine learning model. For example, the second machine learning model can be a larger or more complex model (e.g., more layers and/or parameters) than the first machine learning model. For example, the YOLO11x (extra-large) can be used as the second machine learning model to maximize accuracy, at the cost of additional computational cost. The inventors recognized and realized that a larger and more computationally expensive model may be required for classification, as compared to detection.

Figure 8A:
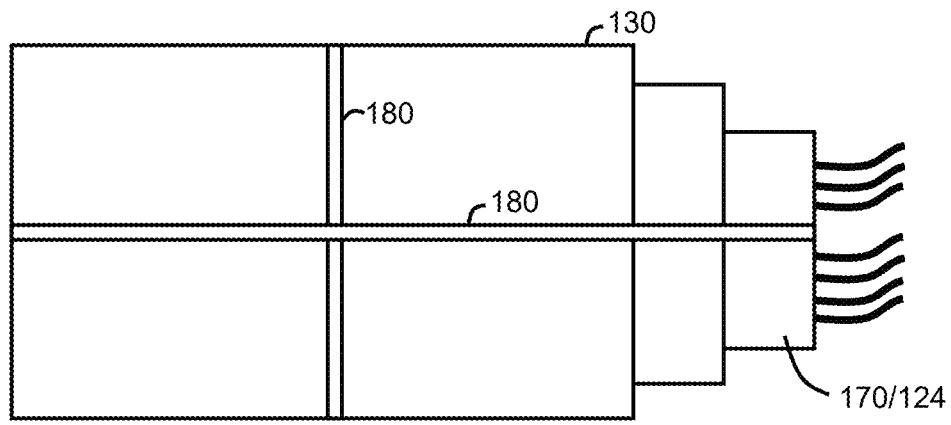
FIG. 8A is a top view of an example telematics device installed in a vehicle, in accordance with an embodiment.

Reference will now be made to FIGS. 8A-J, to illustrate different telematics device installations that can be classified by the image classifier 620 and second machine learning model. FIG. 8A shows example image data 612 depicting a telematics device 130 that can be classified as correctly installed. In the illustrated example, two fasteners 180 are present: a first fastener 180 is attached between the telematics device 130 and either a cable harness 170 or vehicle interface 124, and a second fastener is attached between the telematics device 130 and the vehicle 120. The first and second fasteners 180 encircle the telematics device 130. The first and second fasteners 180 are positioned and oriented such that they intersect. The first fastener 180 is positioned and oriented such that it extends parallel to a longitudinal axis of the telematics device 130. The second fastener 180 is positioned and oriented such that it extends parallel to a transverse axis of the telematics device 130. The first and second fasteners 180 are positioned and oriented such that they are perpendicular to each other. The first and second fasteners 180 are positioned and oriented such that they intersect at substantially at a center of the exterior of the telematics device 130. In this example, the telematics device 130 is secured to the vehicle 120 and the connection between the telematics device 130 and the vehicle interface 124 is also secure. Hence, the second machine learning model can be trained to classify the illustrated example as a good installation.

Figure 8B:
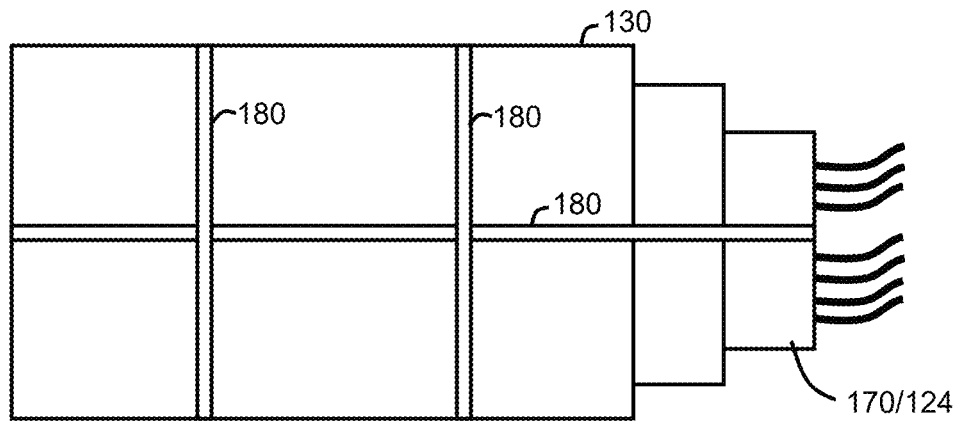
FIG. 8B is a top view of another example telematics device installed in a vehicle, in accordance with an embodiment.

FIG. 8B shows another example of image data 612 depicting a telematics device 130 that can be classified as correctly installed. In the illustrated example, a first fastener 180 is attached between the telematics device 130 and either a cable harness 170 or vehicle interface 124, and second and third fasteners 180 are attached between the telematics device 130 and the vehicle 120. The first, second, and third fasteners 180 each encircle the telematics device 130. The first, second, and third fasteners 180 are positioned and oriented such that the first and second fasteners 180 intersect and the first and third fasteners 180 intersect. The first fastener 180 is positioned and oriented such that it extends parallel to a longitudinal axis of the telematics device 130. The second and third fasteners 180 are positioned and oriented such that they extend parallel to a transverse axis of the telematics device 130. The first, second, and third fasteners 180 are positioned and oriented such that the first and second fasteners 180 perpendicular to each other and the first and third fasteners 180 are perpendicular to each other. In this example, the telematics device 130 is secured to the vehicle 120 and the connection between the telematics device 130 and the vehicle interface 124 is also secure. Hence, the second machine learning model can be trained to classify the illustrated example as a good installation.

Figure 8C:
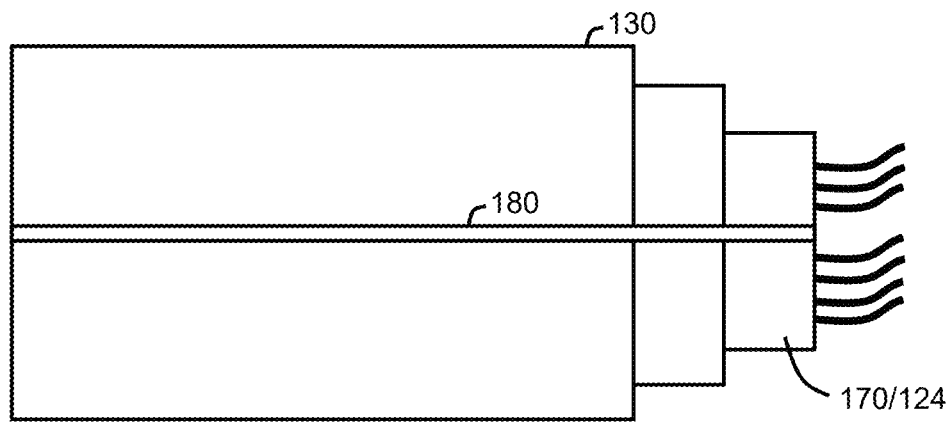
FIG. 8C is a top view of another example telematics device installed in a vehicle, in accordance with an embodiment.

FIG. 8C shows an example of image data 612 depicting a telematics device 130 that can be classified as incorrectly installed. In the illustrated example, a single fastener 180 is present, attached between the telematics device 130 and either a cable harness 170 or vehicle interface 124. The fastener 180 encircles the telematics device 130. The fastener 180 is also positioned and oriented such that it extends parallel to a longitudinal axis of the telematics device 130. In this example, the connection between the telematics device 130 and the vehicle interface 124 is secure. However, the telematics device 130 is not secured to the vehicle 120. Hence, second machine learning model can be trained to classify the illustrated example as a bad installation.

Figure 8D:
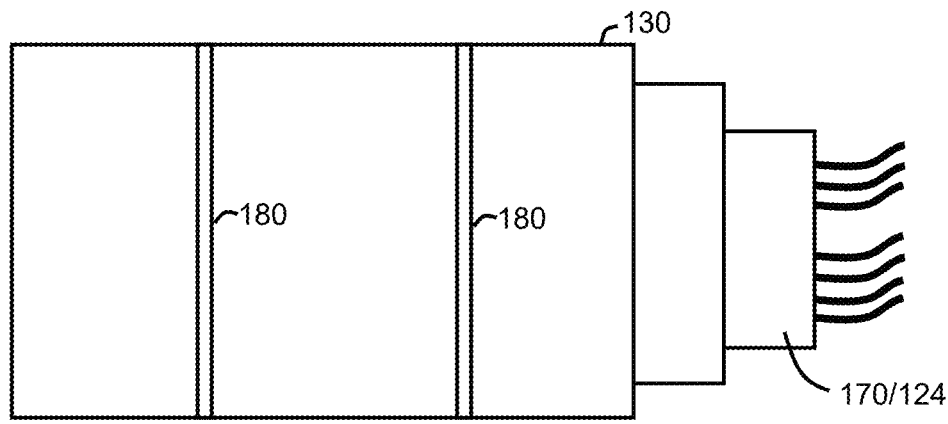
FIG. 8D is a top view of another example telematics device installed in a vehicle, in accordance with an embodiment.

FIG. 8D shows another example of image data 612 depicting a telematics device 130 that can be classified as incorrectly installed. In the illustrated example, two fasteners 180 are present, each attached between the telematics device 130 and vehicle 120. The two fasteners 180 each encircle the telematics device 130. The two fasteners 180 are also positioned and oriented such that they each extend parallel to a transverse axis of the telematics device 130. In this example, the telematics device 130 is secured to the vehicle 120. However, the connection between the telematics device 130 and the vehicle interface 124 is not secured. Hence, the second machine learning can be trained to classify the illustrated example as a bad installation.

Figure 8E:
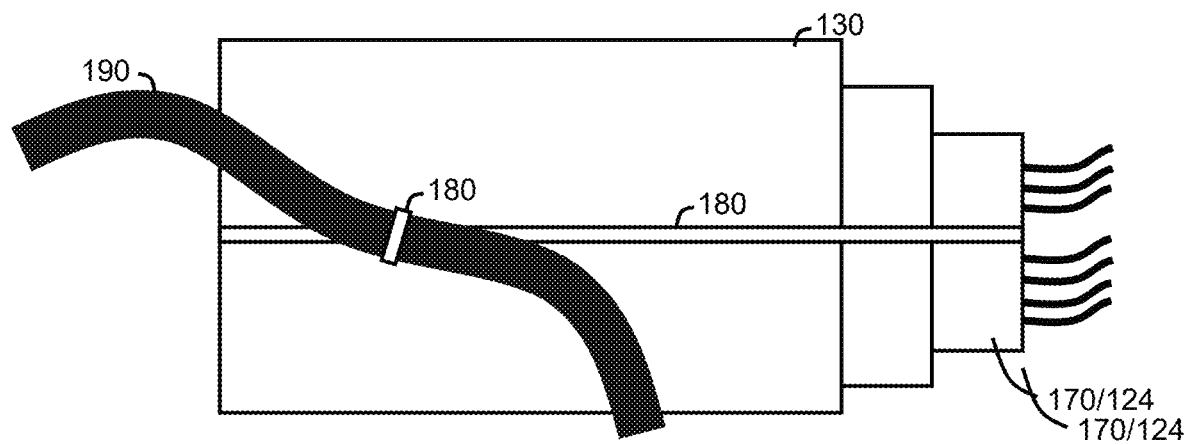
FIG. 8E is a top view of another example telematics device installed in a vehicle, in accordance with an embodiment.

FIG. 8E shows another example of image data 612 depicting a telematics device 130 that can be classified as incorrectly installed. In the illustrated example, two fasteners 180 are present, a first fastener 180 attached between the telematics device 130 and either a cable harness 170 or vehicle interface 124, and a second fastener 180 attached between the first fastener 180 and a vehicle cable 190. Although the first fastener 180 encircles the telematics device 130, the second fastener 180 does not. The first fastener 180 is positioned and oriented such that it extends parallel to a longitudinal axis of the telematics device 130. However, the second fastener 180 does not extend parallel to a transverse axis of the telematics device 130. In this example, the connection between the telematics device 130 and the vehicle interface 124 is secured. However, the telematics device 130 is not adequately secured to the vehicle 120. Hence, the second machine learning can be trained to classify the illustrated example as a bad installation.

Figure 8F:
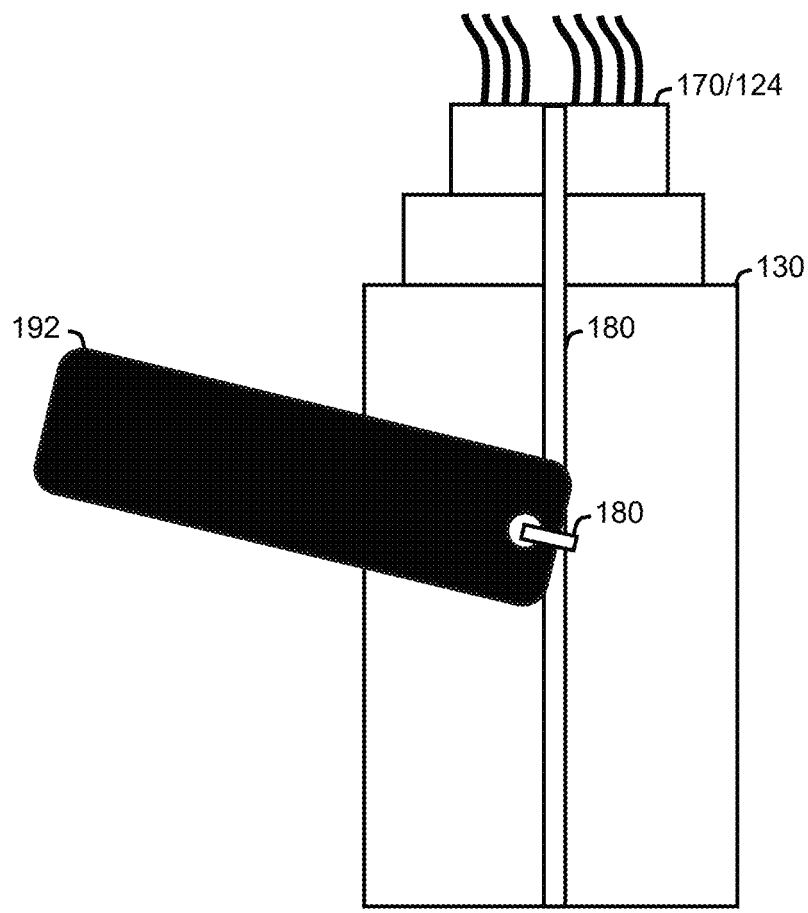
FIG. 8F is a top view of another example telematics device installed in a vehicle, in accordance with an embodiment.

FIG. 8F shows another example of image data 612 depicting a telematics device 130 that can be classified as incorrectly installed. In the illustrated example, two fasteners 180 are present, a first fastener 180 attached between the telematics device 130 and either a cable harness 170 or vehicle interface 124, and a second fastener 180 attached between the first fastener 180 and a metal object 192. Although the first fastener 180 encircles the telematics device 130, the second fastener 180 does not. The first fastener 180 is positioned and oriented such that it extends parallel to a longitudinal axis of the telematics device 130. However, the second fastener 180 does not extend parallel to a transverse axis of the telematics device 130. In this example, the connection between the telematics device 130 and the vehicle interface 124 is secured. However, the telematics device 130 is not adequately secured to the vehicle 120. Hence, the second machine learning can be trained to classify the illustrated example as a bad installation.

Figure 8G:
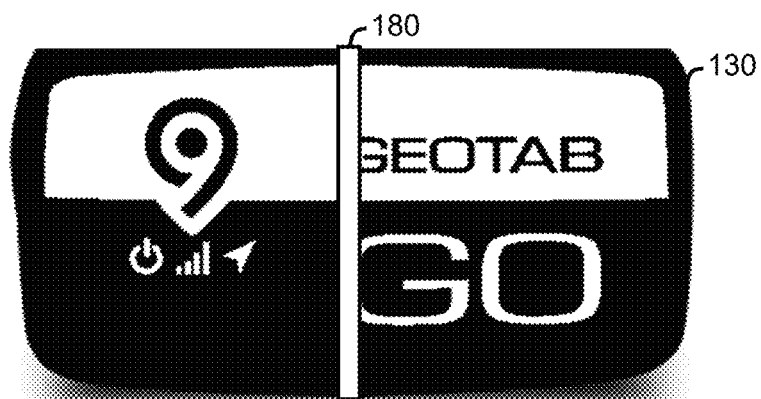
FIG. 8G is a side view of another example telematics device installed in a vehicle, in accordance with an embodiment.

FIG. 8G shows another example of image data 612 depicting a telematics device 130 that can be classified as incorrectly installed. In the illustrated example, only a single fastener 180 is present. However, it is not clear whether the first fastener 180 encircles the telematics device 130. In this example, it is unclear whether the connection between the telematics device 130 and the vehicle interface 124 is secured. As well, it is unclear whether the telematics device 130 is secured to the vehicle 120. Hence, the second machine learning can be trained to classify the illustrated example as a bad installation.

Figure 8H:
FIG. 8H is a perspective view of another example telematics device installed in a vehicle, in accordance with an embodiment.

FIG. 8H shows another example of image data 612 depicting a telematics device 130 that can be classified as incorrectly installed. In the illustrated example, no fasteners 180 are present. In this example, the connection between the telematics device 130 and the vehicle interface 124 is not secured. As well, the telematics device 130 is not secured to the vehicle 120. Hence, the second machine learning can be trained to classify the illustrated example as a bad installation.

Figure 8I:
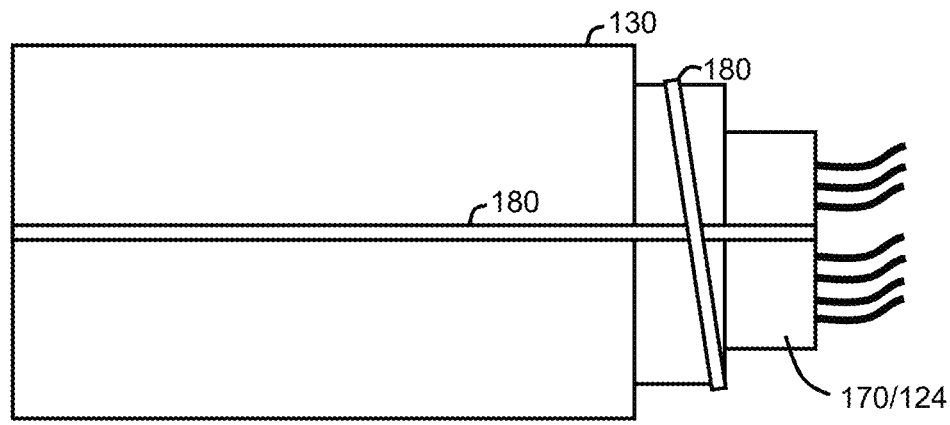
FIG. 8I is a top view of another example telematics device installed in a vehicle, in accordance with an embodiment.

FIG. 8I shows another example of image data 612 depicting a telematics device 130 that can be classified as incorrectly installed. In the illustrated example, two fasteners 180 are present, a first fastener 180 attached between the telematics device 130 and either a cable harness 170 or vehicle interface 124, and a second fastener 180 attached between the telematics device 130 and the vehicle 120. Both fasteners 180 each encircle the telematics device 130. The first fastener 180 is positioned and oriented such that it extends parallel to a longitudinal axis of the telematics device 130. However, the second fastener 180 does not extend parallel to a transverse axis of the telematics device 130. In this example, the connection between the telematics device 130 and the vehicle interface 124 is secured. However, the telematics device 130 is not adequately secured to the vehicle 120. Hence, the second machine learning can be trained to classify the illustrated example as a bad installation.

Figure 8J:
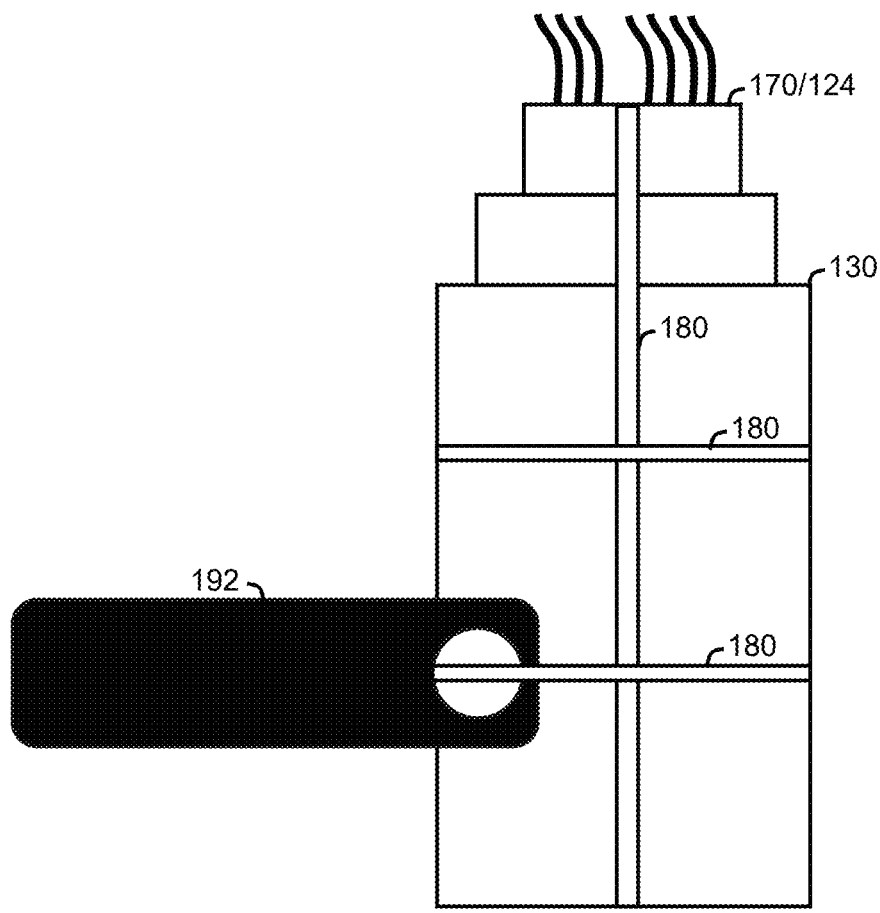
FIG. 8J is a top view of another example telematics device installed in a vehicle, in accordance with an embodiment.

FIG. 8J shows another example of image data 612 depicting a telematics device 130 that can be classified as correctly installed. In the illustrated example, three fasteners 180 are present, a first fastener 180 attached between the telematics device 130 and either a cable harness 170 or vehicle interface 124, a second fastener 180 attached between the telematics device and the vehicle 120, and a third fastener 180 attached between the telematics device 130 and a metal object 192. All three fasteners 180 each encircle the telematics device 130. The first fastener 180 is positioned and oriented such that it extends parallel to a longitudinal axis of the telematics device 130. The second and third fasteners 180 are each positioned and oriented such that they both extend parallel to a transverse axis of the telematics device 130. In this example, the connection between the telematics device 130 and the vehicle interface 124 is secured. Likewise, the telematics device 130 is secured to the vehicle 120. Hence, the second machine learning can be trained to classify the illustrated example as a good installation.

Referring back to FIG. 6A, the automatic responder 630 can automatically execute one or more actions in response to and based on the classification of whether the telematics device 130 was correctly installed. The inventors recognized and realized that these automatic computer-implemented actions could provide a number of advantages over a manual response by a human, including, but not limited to, speed and efficiency, consistency and accuracy, scalability, cost-effectiveness, and availability. Various automatic actions will now be described. It should be appreciated that any combinations of actions may be executed by the automatic responder 630.

In some embodiments, the automatic responder 630 can automatically transmit an electronic notification to a user 160 associated with the telematics device 130, such as a driver, fleet manager, installer, reseller, etc. The electronic notification can cause a computing device 150 associated with the user 160 to display an indication that the telematics device 130 was correctly or incorrectly installed. This can confirm that the telematics device 130 was correctly installed to the user 160 or alert the user 160 that an improper installation needs to be fixed.

Additionally, or alternatively, the automatic responder 630 can automatically request various data from a user 160 associated with the telematics device 130, such as a driver, fleet manager, installer, reseller, etc. For example, the automatic responder 630 may request electronic feedback from the user 160, confirming whether the telematics device 130 was indeed correctly or incorrectly installed. The feedback data received from the user 160 can be used to assess the accuracy of the first and/or second machine learning models. The feedback data can also be used to retrain the first and/or second machine learning models. Additionally, or alternatively, the automatic responder 630 can request additional data from the user 160 when the telematics device 130 is not correctly installed. For example, the automatic responder 630 may request additional image data 602 from the user 160 to verify that an improper installation has been corrected. The additional image data 602 can also be processed by the object detector 610 and image classifier 620 to verify that the installation was corrected. The automatic responder 630 may request additional image data 602, until the installation is determined by the image classifier 620 to be correct.

Additionally, or alternatively, the automatic responder 630 can store an indication that the telematics device 130 is correctly or incorrectly installed. The indication can be used in various ways. For example, the fleet management system 110 may use the indication to exclude various data received from the telematics device 130 from various types of processing. This can allow the fleet management system 110 to exclude erroneous data from such processing, improving data integrity and reducing unnecessary processing. Additionally, or alternatively, the fleet management system 110 may use the indication to automatically process RMA (return merchandise authorization) requests. The fleet management system 110 may automatically reject RMA requests involving telematics devices 130 that have been determined to be incorrectly installed. Additionally, or alternatively, the fleet management system 110 may use the indication to automatically categorize support requests based on whether they involve a telematics device 130 that is correctly or incorrectly installed.

Figure 6B:
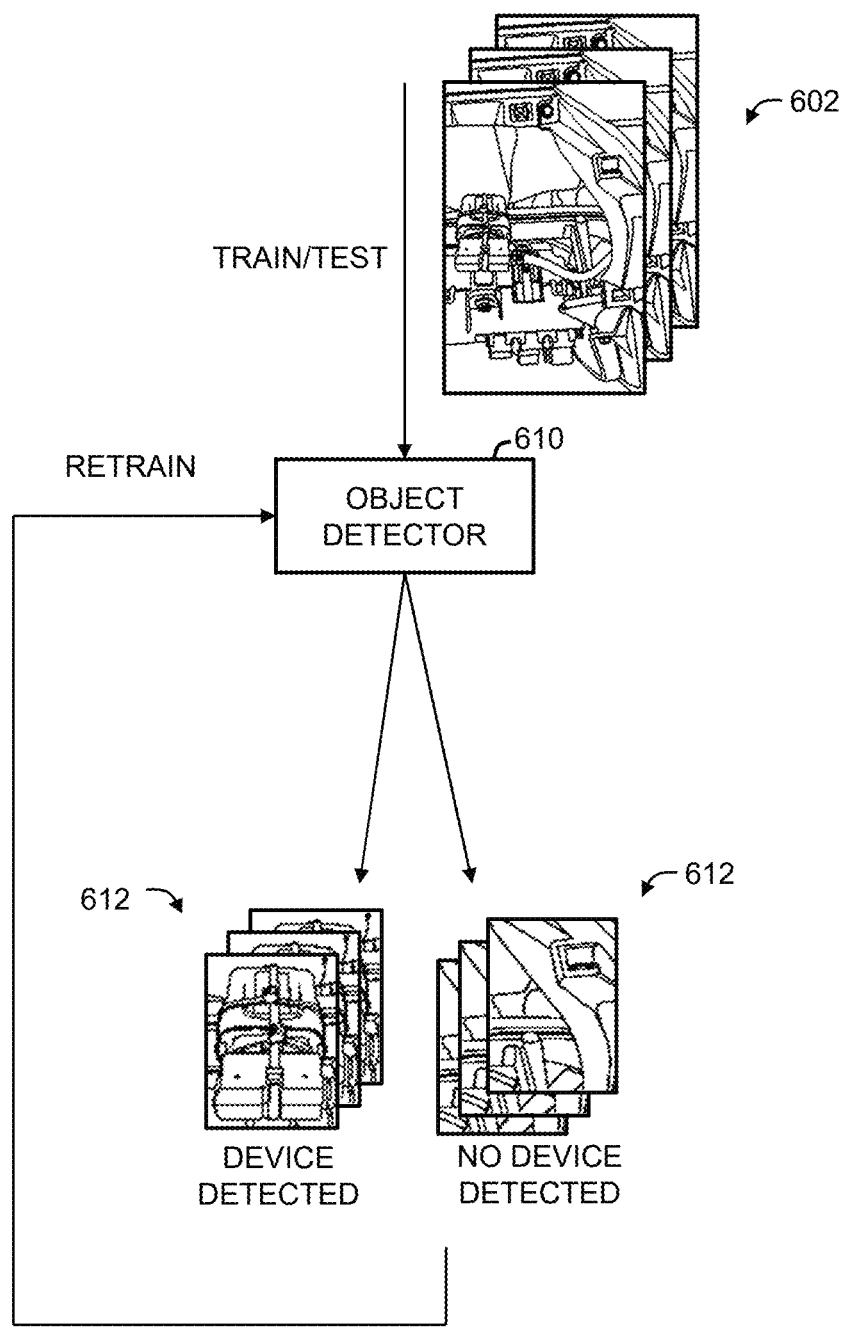
FIG. 6B is a block diagram of an example system for training an object detector for a bad installation detection system, in accordance with an embodiment.
Figure 6C:
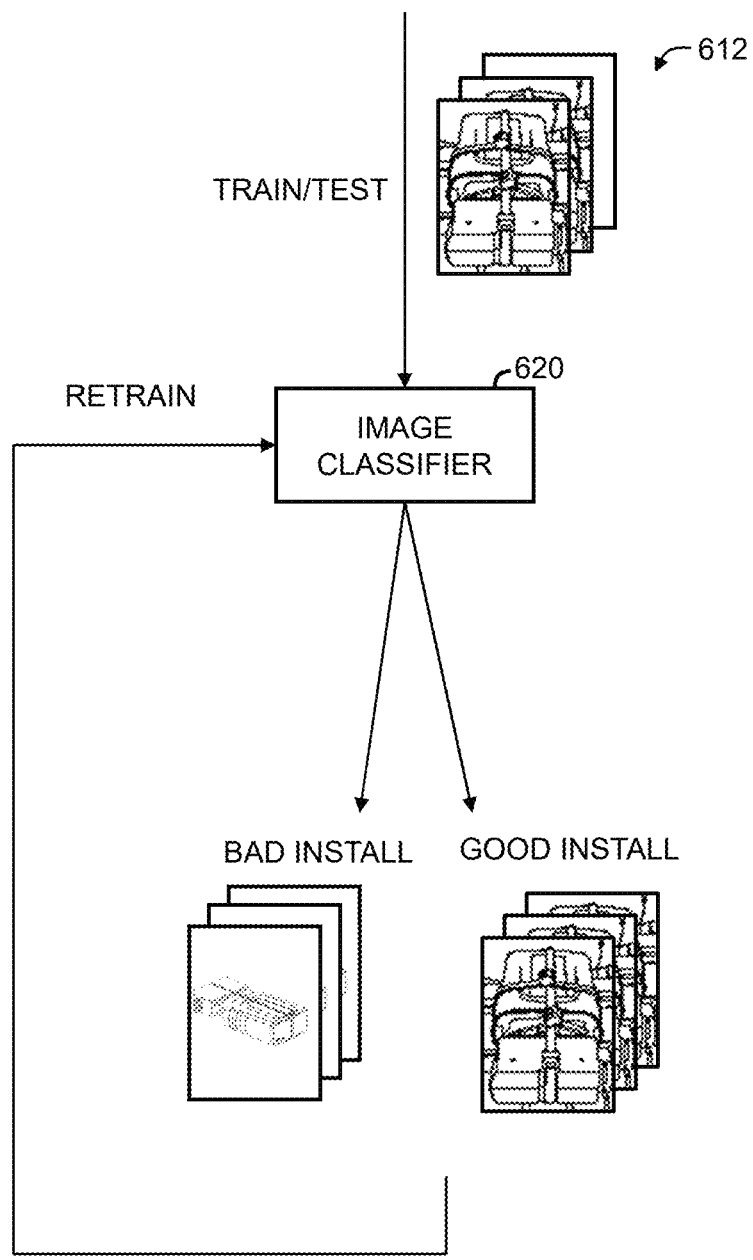
FIG. 6C is a block diagram of an example system for training an image classifier for a bad installation detection system, in accordance with an embodiment.

Reference will now be made to FIGS. 6B and 6C to explain how the first and second machine learning models of the object detector 610 and image classifier 620 can be created through training. FIG. 6B shows an example system for training a first machine learning model for an object detector 610. As shown, the first machine learning model can be trained using example image data 602 associated with telematics device installations. Through training, the first machine learning model can identify patterns in the image data 602 to accurately detect telematics devices 130 in other image data 602. The training can involve an iterative process in which the model learns to identify features in the image data 602 and adjusts various model parameters. For example, the image data 602 can include various labeled images (i.e., indicating whether an image contains a telematics device 130 and where the telematics device 130 is in the image), and the training can involve correlating various features in the image data 602 to the labels and adjusting various model parameters to minimize the error or difference between the labels and model predictions or outputs. For a CNN, this can involve adjusting the weights and biases using an optimization algorithm.

As shown, some predictions made by the first machine learning model may be used to further train the model. For example, in some cases, the first machine learning model may detect a telematics device 130 in image data 602 that does not actually contain a telematics device 130. These false positives can be used as additional examples to further train the model. The inventors recognized and realized that various objects may share a similar appearance to a telematics device 130 and may therefore be difficult to discern by a model. For instance, other devices, including, but not limited to, accessory devices 170, may share a similar appearance to a telematics device 130. Likewise, serial numbers and/or barcode that commonly appear on telematics devices 130 may also appear on other objects. The inventors recognized and realized that retraining the first machine learning model using examples of these false positives could significantly improve the performance of the model. As explained herein, the retraining can be automated, for example, based on feedback data automatically collected in response to and based on the classification of whether a telematics device 130 was correctly installed.

FIG. 6C shows an example system for training a second machine learning model for an image classifier 620. As shown, the second machine learning model can be trained using example extracted image data 612 containing a telematics device 130. Through training, the second machine learning model can identify patterns in the image data 612 to accurately classify whether telematics devices 130 are installed correctly in other image data 612. The training can involve an iterative process in which the model learns to identify features in the image data 612 and adjusts various model parameters. For example, the image data 612 can include various labeled images (i.e., indicating whether the telematics device 130 contained in the image is installed correctly), and the training can involve correlating various features in the image data 612 to the labels and adjusting various model parameters to minimize the error or difference between the labels and model predictions or outputs. For a CNN, this can involve adjusting the weights and biases using an optimization algorithm.

As shown, some predictions made by the second machine learning model may be used to further train the model. For example, in some cases, the second machine learning model may classify a telematics device 130 as correctly installed, even though the device was not actually correctly installed. These false positives can be used as additional examples to further train the model. This can involve collecting feedback data from users 160 confirming whether a telematics device was indeed installed correctly.

Figure 7:
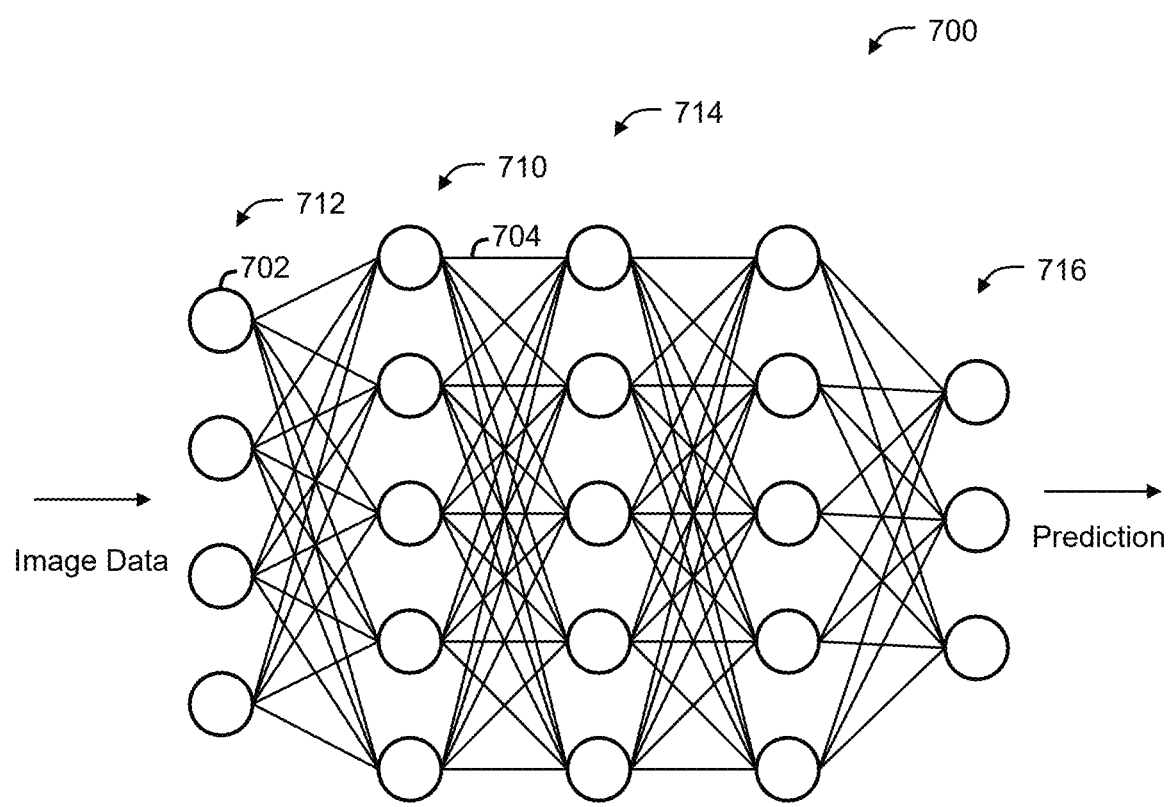
FIG. 7 is a block diagram of an example artificial neural network, in accordance with an embodiment.

FIG. 7 shows an example artificial neural network 700 that may be used as a machine learning model by the object detector 610 and/or image classifier 620. The artificial neural network 700 is a computer-implemented model based on the structure and function of a human brain. As shown, the artificial neural network 700 can include a plurality of nodes or neurons 702. Each node 702 can receive input signals, process them, and produce output signals. The nodes 702 can be interconnected through various connections 704 and be generally organized into a plurality of layers 710. In the illustrated example, the layers 710 include an input layer 712, which can receive initial image data, hidden layers 714, which perform a variety of computations, and an output layer 716, which can produce a final output or prediction. The connections 704 between nodes 702 can have different weights, representing the strength of the connection 704. The nodes 702 can have bias parameters that affect their outputs. The artificial neural network 700 can be trained by adjusting the biases of the nodes 702 and the weights of the connections 704 based on labeled training data. The number, arrangement, and nature of the nodes 702, connections 704, and layers 710 can vary, depending on application of the artificial neural network 700. For example, a CNN may include convolutional layers 710 that apply convolution operations to the input image data to detect features in the image, such as, edges, corners, textures, etc. The artificial neural network 700 can include a backpropagation feature, which allows errors to be propagated backward through the artificial neural network 700. This can be used to determine how each part of the neural network 700 contributed to the error, which can then be adjusted using an optimization algorithm to minimize a loss function.

Figure 15:
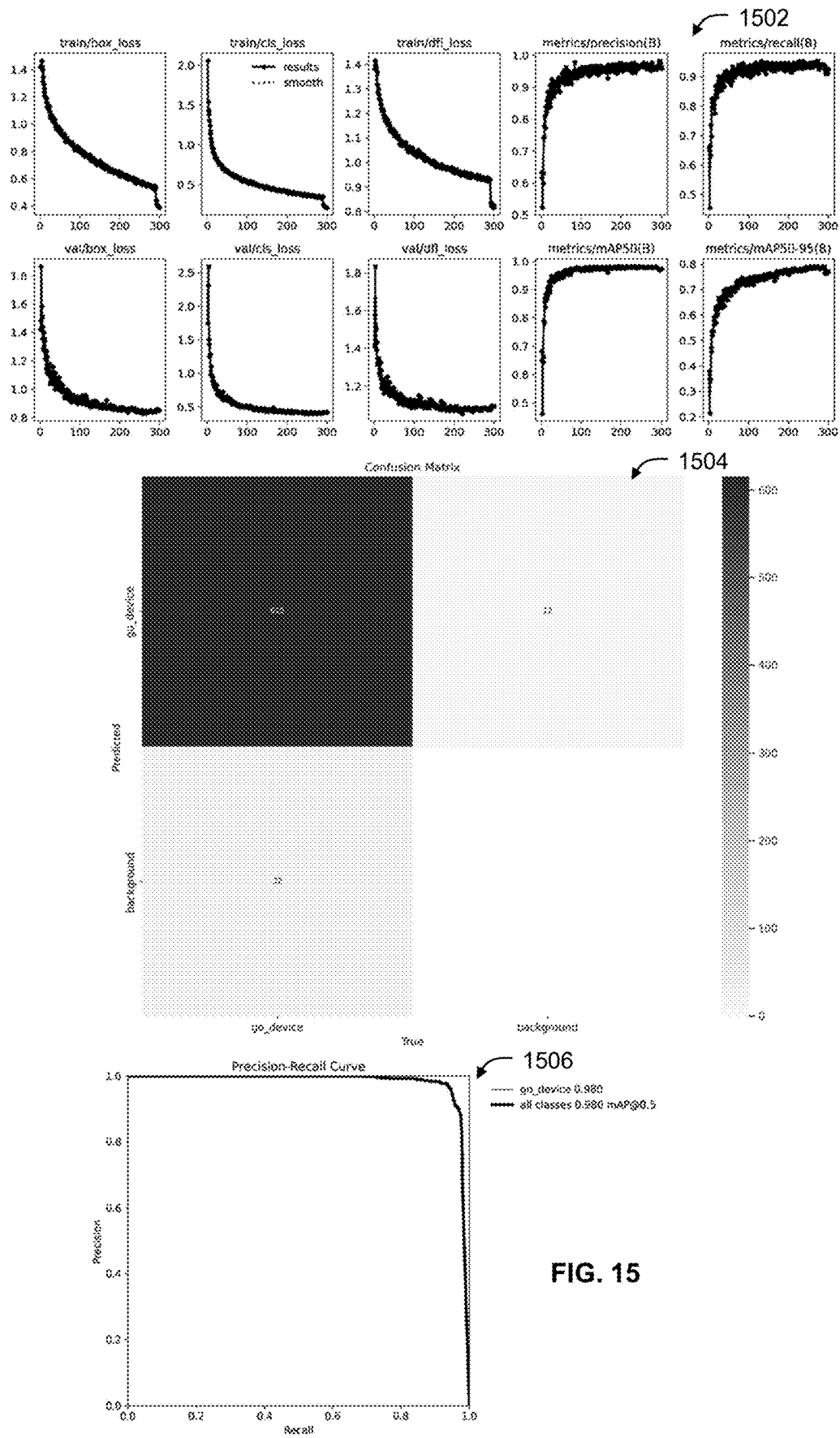
FIG. 15 is a plurality of graphs of various performance metrics of an example first machine learning model.

FIG. 15 shows various graphs of performance metrics of an example first machine learning model. In the illustrated example, a YOLO11n model was trained to detect telematics devices 130 using various labeled image data 602. Graphs 1502 show that the model has good performance and convergence over the course of training. In particular, graphs 1502 show that various loss functions (i.e., bounding box loss, classification loss, and distribution focal loss) decrease over training epochs and converge to a low value for both training and validation datasets. As well, precision and recall increase over training epochs and converge to a high value. Likewise, confusion matrix 1504 shows that the model can correctly detect telematics devices 130 (or the absence thereof), with minimal false negatives and false positives. Precision-recall curve 1506 also shows good separation of positive and negative cases, with minimal false negatives and false positives.

Figure 16:
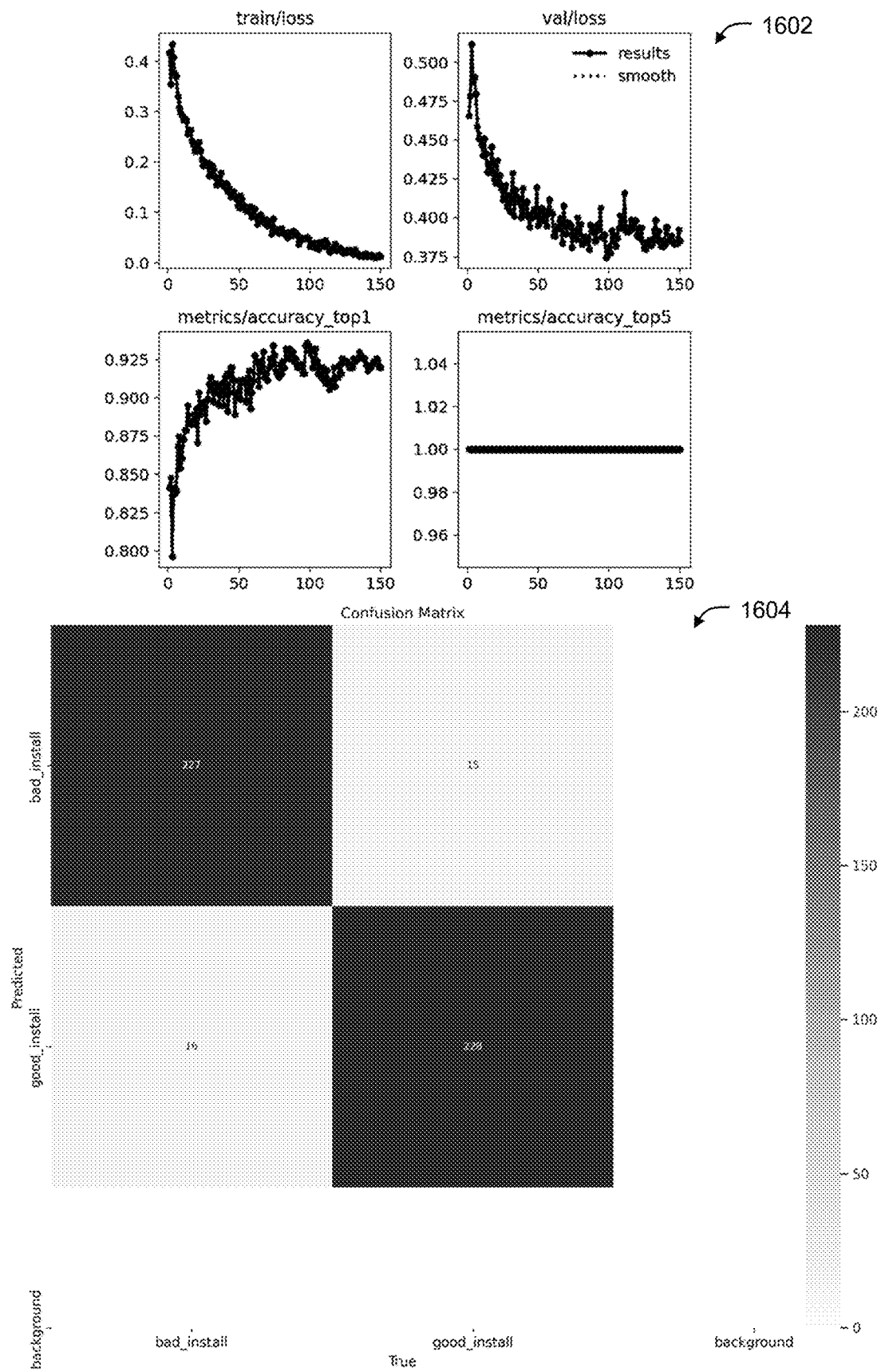
FIG. 16 is a plurality of graphs of various performance metrics of an example second machine learning model.

FIG. 16 shows various graphs of performance metrics of an example second machine learning model. In the illustrated example, a YOLO11x model was trained to classify telematics device installations based on various aspects of fasteners 180 attached to the telematics devices 130. Graphs 1602 show that the model has good performance and convergence over the course of training. In particular, graphs 1602 show that the loss function decreases over training epochs and converges to a low value for both training and validation datasets. As well, accuracy increases over training epochs and converges to a high value. Likewise, confusion matrix 1604 shows that the model can correctly classify installations, with minimal false negatives and false positives.

Figure 9:
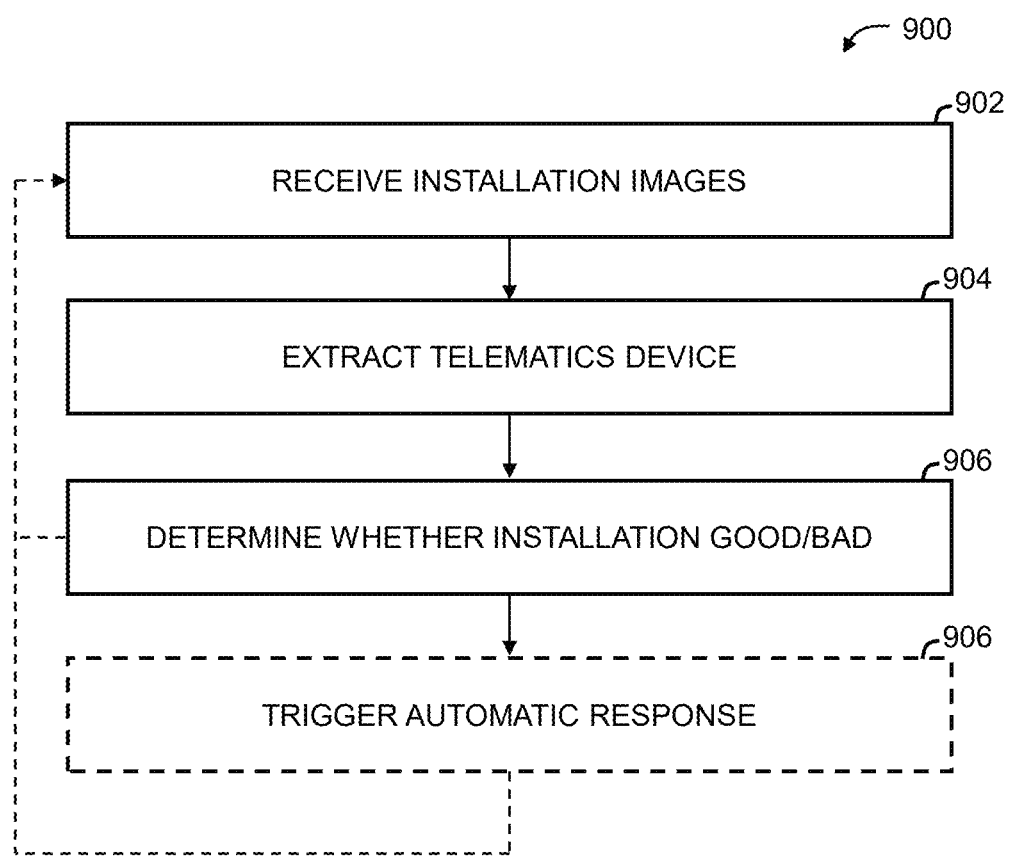
FIG. 9 is flow chart of an example method for detecting bad telematics device installations, in accordance with an embodiment.

FIG. 9 shows an example method 900 for detecting bad telematics device installations. The bad installation detection method 900 can use one or more computer-implemented machine learning models to detect bad telematics device installations based on one or more images of the installation. The bad installation detection method 900 can provide various advantages described herein, including, but not limited to, speed, efficiency, consistency, reliability, accuracy, precision, scalability, accessibility, etc.

The bad installation detection method 900 can be implemented using the bad installation detection system 600. For example, the bad installation detection method 900 can be implemented at the fleet management system 110 (e.g., by at least one processor 112 executing instructions stored on at least one data storage 114), one or more computing devices 150 (e.g., by at least one processor 152 executing instructions stored on at least one data storage 154), or a combination thereof. In other words, the bad installation detection method 900 can be implemented by any of the one or more processors 112, 152 executing instructions stored on any of the one or more data storages 114, 154.

At 902, image data 602 associated with an installation of a telematics device 130 in a vehicle 120 can be received. For example, the object detector 610 can receive the image data 602. The image data 602 can include one or more electronic images associated with the installation of the telematics device 130. The image data 602 may include one or more image files that depict the telematics device 130 in various positions and from different perspectives. In some cases, the image data 602 may include one or more images associated with the installation that do not depict a telematics device 130.

The image data 602 can be received in various computer file formats. For example, the image data 602 may include one or more digital arrays of values that represent color and/or intensity. In general, the image data 602 can include any digital representation of a visual scene related to a telematics device installation that exists in a computer format and can be stored and manipulated electronically. The image data 602 may originate from various sources, including, but not limited to installers uploading image files as evidence of installations, customers submitting image files when requesting technical support, etc. In some cases, the image data 602 may be received in response to a request for the image data 602, for example, displayed at a computing device 150 associated with an installer.

At 904, a portion 612 of the image data 602 containing the telematics device 130 can be extracted using a first machine learning model. The first machine learning model can be trained to detect the telematics deice 130 in the image data 602. For example, the object detector 610 can detect the telematics device 130 in the image data 602 and extract the portion 612 of the image data 602 containing the telematics device 130. The first machine learning model can detect the telematics device 130 in the image data 602 by extracting various features in the image data 602 and performing various analysis on the features to identify and locate the telematics device 130 in the image data 602. Various features can be analyzed by the first machine learning model to identify, locate, and extract the telematics device 130, including, but not limited to edges, corners, blobs, ridges shapes, colors, etc. Extracting the image data 612 containing the telematics device 130 can involve identifying and cropping specific regions of the image data 602. For example, a bounding box can be defined surrounding the telematics device 130 and/or other objects in the image data 602.

The first machine learning model can include various types of models, including, but not limited to, a convolutional neural network. The convolutional neural network may be implemented as part of a YOLO (You Only Look Once) algorithm, such as, but not limited to YOLO, YOLOv2, YOLOv3, YOLOV4, YOLOv5, YOLOv6, YOLOV7, YOLOV8, YOLO-NAS, YOLO-World, YOLOv9, YOLOv10, YOLOv11, etc. Additionally or alternatively, various object detection algorithms can be executed, including, but are not limited to, Retina-Net, R-CNN (Region-based Convolutional Neural Networks), Single Shot MultiBox Detector (SSD), YOLACT (You Only Look at Coefficients), SOLO (Segmenting Objects by Locations), etc. Likewise, the first machine learning model can include other types of machine learning models, such as, but not limited to, artificial neural networks, decision trees, support-vector machines, nearest neighbors, linear regression, logistical regression, Bayesian networks, random forests, genetic algorithms, ensemble models, etc. The models may be trained using supervised, unsupervised, semi-supervised, reinforcement, or other types of learning. In general, the first machine learning model can include any model that is trained to detect a telematics device 130 in image data 602, without being explicitly programmed to do so.

At 906, it can be determined whether the telematics device 130 was correctly installed using a second machine learning model on the extracted image data 612. The second machine learning model can be trained to classify the telematics device 130 in the extracted image data 612 (i.e., as correctly or incorrectly installed) based on one or more fasteners 180 attached to the telematics device 130. For example, the image classifier 620 may classify the telematics device 130 based on one or more fasteners 180 attached to the telematics device 130. The second machine learning model can classify the telematics device 130 based on various aspects of the fasteners 180. This can involve extracting various features in the extracted image data 612 and performing various analysis on the features to identify and locate one or more fasteners 180 and/or other objects. The features and analysis performed by the second machine learning model can vary depending on the type of model and training used to create the model. The second machine learning model can extract and analyze various image features to detect the fasteners 180, such as, but not limited to, edges, corners, blobs, ridges shapes, colors, etc. For example, the second machine learning models may identify boundaries through edge detection, locate key points using corner detection, and/or use shape descriptors or color analysis to categorize and locate fasteners 180 and other objects in the extracted image data 612.

The telematics device 130 can be classified based on various aspects of the fasteners 180. In some embodiments, the telematics device 130 can be classified based on the number or quantity of fasteners 180 attached to the telematics device 130. The telematics device 130 can be classified as correctly installed if the number of fasteners 180 attached to the telematics device 130 meets or exceeds a predetermined minimum number of fasteners 180. Likewise, the telematics device 130 can be classified as incorrectly installed if there the number of fasteners 180 attached to the telematics device 130 is less than the predetermined minimum number of fasteners 180. For example, the second machine learning model can classify the telematics device 130 as correctly installed if at least one, two, three, or more fasteners 180 are attached to the telematics device. Likewise, the second machine learning model can classify the telematics device 130 as incorrectly installed if less than one, two, three, or more fasteners 180 are attached to the telematics device 130.

Additionally, or alternatively, the telematics device 130 can be classified based on whether the fasteners 180 encircle the telematics device 130. That is, the second machine learning model can determine whether the fasteners 180 enclose, wrap around, or otherwise form a loop around the telematics device 130. The second machine learning model can classify the telematics device 130 as correctly installed if the fasteners 180 encircle the telematics devices 130. Conversely, the second machine learning model can classify the telematics device 130 as incorrectly installed if the fasteners 180 do not encircle the telematics device 130.

Additionally, or alternatively, the telematics device 130 can be classified based on a position and orientation of the fasteners 180. For example, the second machine learning model can determine whether a fastener 180 extends perpendicular or parallel to a longitudinal or transverse axis of the telematics device 130. The second machine learning model may classify the telematics device 130 as correctly installed if a fastener 180 extends perpendicular or parallel to a longitudinal or transverse axis of the telematics device 130. Conversely, the second machine learning model may classify the telematics device 130 as incorrectly installed if the fastener 180 does not extend perpendicular or parallel to a longitudinal or transverse axis of the telematics device 130.

Additionally, or alternatively, the second machine learning model can determine whether one or more fasteners 180 are perpendicular or parallel to a cable harness 170 and/or vehicle interface. For example, the second machine learning model can classify the telematics device 130 as correctly installed if the fasteners 180 are perpendicular or parallel to a cable harness 170. Conversely, the second machine learning model can classify the telematics device 130 as incorrectly installed if the fasteners 180 are not perpendicular or parallel to the cable harness 170.

Additionally, or alternatively, the second machine learning model can determine whether two or more fasteners 180 intersect or overlap. The second machine learning model can classify the telematics device 130 as correctly installed if a first fastener 180 and second fastener 180 intersect. Conversely, the second machine learning models can classify the telematics device 130 as incorrectly installed if the first and second fasteners 180 do not intersect.

Additionally, or alternatively, the second machine learning model can determine whether two or more fasteners 180 are perpendicular to each other. For example, the second machine learning model can classify the telematics device 130 as correctly installed if a first fastener 180 and second fastener 180 are perpendicular to each other. Conversely, the second machine learning model can classify the telematics device 130 as incorrectly installed if the first and second fasteners 180 are not perpendicular to each other.

Additionally, or alternatively, the second machine learning model can determine whether two or more fasteners 180 intersect substantially in the middle of the telematics device 130. For example, the second machine learning model can classify the telematics device 130 as correctly installed if a first fastener 180 and a second fastener 180 intersect substantially in the middle of the telematics device 130. Conversely, the second machine learning model can classify the telematics device 130 as incorrectly installed if the first and second fasteners 180 do not intersect substantially in the middle of the telematics device 130.

Additionally, or alternatively, the second machine learning model can classify the telematic devices 130 based on a position and orientation of the telematics device 130. For example, the second machine learning model can classify the telematics device 130 as correctly installed if a predetermined side of the telematics device 130 is substantially unobstructed. Conversely, the second machine learning model may classify the telematics device 130 as incorrectly installed if the predetermined side of the telematics device 130 is substantially obstructed. As another example, the second machine learning model may classify the telematics device 130 as correctly installed if a predetermined side of the telematics device 130 substantially faces upward (i.e., perpendicular to the ground). Conversely, the second machine learning model may classify the telematics device 130 as incorrectly installed if the predetermined side of the telematics device 130 does not face upward.

Additionally, or alternatively, the telematics device 130 can be classified based on telematics data received from the telematics devices 130. The analysis of the telematics data can be executed by the second machine learning model or by another model. The telematics data can include, but is not limited to, acceleration data, ignition data, and/or device fault data. For example, the telematics device 130 can be classified based on whether acceleration data does not contain anomalies, outliers, and/or other irregularities associated with an insecure or loose attachment. The telematics device 130 can be classified as correctly installed if the acceleration data does not contain anomalies, outliers, and/ or other irregularities associated with an insecure or loose attachment. Conversely, the telematics device 130 may be classified as incorrectly installed if the acceleration data does contain anomalies, outliers, and/or other irregularities associated with an insecure or loose attachment.

Likewise, the telematics device 130 can be classified based on whether certain types of telematics data is received. For example, the telematics device 130 may be classified as correctly installed if engine ignition data is received. Conversely, the telematics device 130 may be classified as incorrectly installed if engine ignition data is not received. Similarly, the telematics device 130 can be classified based on a presence or absence of one or more faults in the device fault data. The telematics device 130 can be classified based on a presence or absence of one or more faults in the device fault data. For example, the telematics device 130 can be classified as correctly installed if a particular device fault data is received. Conversely, the telematics device 130 can be classified as incorrectly installed if the particular device fault data is not received.

The second machine learning model can include the same or different types of machine learning models as the first machine learning model, including, but not limited to, a convolutional neural network. The convolutional neural network may be implemented as part of a YOLO (You Only Look Once) algorithm, such as, but not limited to YOLO, YOLOv2, YOLOv3, YOLOv4, YOLOv5, YOLOV6, YOLOV7, YOLOV8, YOLO-NAS, YOLO-World, YOLOv9, YOLOv10, YOLOv11, etc. Additionally or alternatively, various object detection algorithms can be executed, including, but are not limited to, Retina-Net, R-CNN (Region-based Convolutional Neural Networks), Single Shot MultiBox Detector (SSD), YOLACT (You Only Look at Coefficients), SOLO (Segmenting Objects by Locations), etc. Likewise, the second machine learning model can include other types of machine learning models, such as, but not limited to, artificial neural networks, decision trees, support-vector machines, nearest neighbors, linear regression, logistical regression, Bayesian networks, random forests, genetic algorithms, ensemble models, etc. The models may be trained using supervised, unsupervised, semi-supervised, reinforcement, or other types of learning. In general, the second machine learning model can include any model that is trained to classify a telematics device 130 in extracted image data 612 as correctly or incorrectly installed, without being explicitly programmed to do so.

At 908, one or more actions can be automatically executed or triggered based on and in response to the determination of whether the telematics device 130 was installed correctly (i.e., at 906). For example, the automatic responder 630 can trigger various actions in response to the determination made by the image classifier 620. In some embodiments, the actions can include transmitting an electronic notification to a user 160 associated with the telematics device 130, such as a driver, fleet manager, installer, reseller, etc. The electronic notification can cause a computing device 150 associated with the user 160 to display an indication that the telematics device 130 was correctly or incorrectly installed. This can confirm that the telematics device 130 was correctly installed to the user 160 or alert the user 160 of an improper installation that needs to be fixed.

Additionally, or alternatively, the actions can include requesting various data from a user 160 associated with the telematics device 130, such as a driver, fleet manager, installer, reseller, etc. For example, electronic feedback can be requested from the user 160 confirming whether the telematics device 130 was actually correctly or incorrectly installed. The feedback data received from the user 160 can be used to assess the accuracy of the first and/or second machine learning models. The feedback data can also be used to retrain the first and/or second machine learning models. Additionally, or alternatively, additional data can be requested from the user 160 when the telematics device 130 is not correctly installed. For example, additional image data 602 can be requested from the user 160 when the telematics device 130 is not correctly installed to verify that the installation has been corrected. For instance, a request for second image data 602 associated with the installation can be displayed at a computing device 150 associated with an installer. The second image data 602 can also be processed by the bad installation detection method 900 (i.e., received at 902, extracted at 904, determined at 906) to verify that the installation was corrected. Additional image data 602 may be requested at 908 until the installation is determined to be correct at 906.

Additionally, or alternatively, the actions can include storing an indication that the telematics device 130 is correctly or incorrectly installed. For example, the indication may be stored in data storage 114 and/or 154. The indication can be used in various ways. For example, the fleet management system 110 may use the indication to exclude at least some of the telematics data received from the telematics device 130 from various types of processing. In other words, the fleet management system 110 may receive telematics data from other telematics devices 130 and process that telematics data, while excluding telematics data from the telematics device 130 that was installed incorrectly from the processing. As another example, the fleet management system 110 may use the indication to automatically process RMA (return merchandise authorization) requests. The fleet management system 110 may determine that the telematics device 130 that was installed incorrectly is associated with one or more RMA requests and automatically deny those RMA requests. As a further example, the fleet management system 110 may use the indication to automatically categorize support requests based on whether they involve a telematics device 130 that is correctly or incorrectly installed.

Additionally, or alternatively, the actions can include retraining the first and/or second machine learning models. False positives and/or false negatives may be used as examples to further train the first and/or second machine learning models. For example, if it is determined that the first machine learning model detected a telematics device 130 in the image data 602, but the extracted image data 612 does not contain a telematics device 130, the first machine learning model can be retrained using the image data 602 in which a telematics device 130 was falsely detected. The image data 602 used to retrain the first machine learning model may contain a serial number, barcode and/or accessory device 170. Likewise, if it is determined that that the second machine learning model classified a telematics device 130 as correctly installed, but the telematics device 130 was not correctly installed, the second machine learning model can be retrained using the extracted image data 612 that was falsely classified as a correct installation. Furthermore, feedback data collected from users 160 may be used to assess and/or retrain the first and/or second machine learning models.

Figure 10:
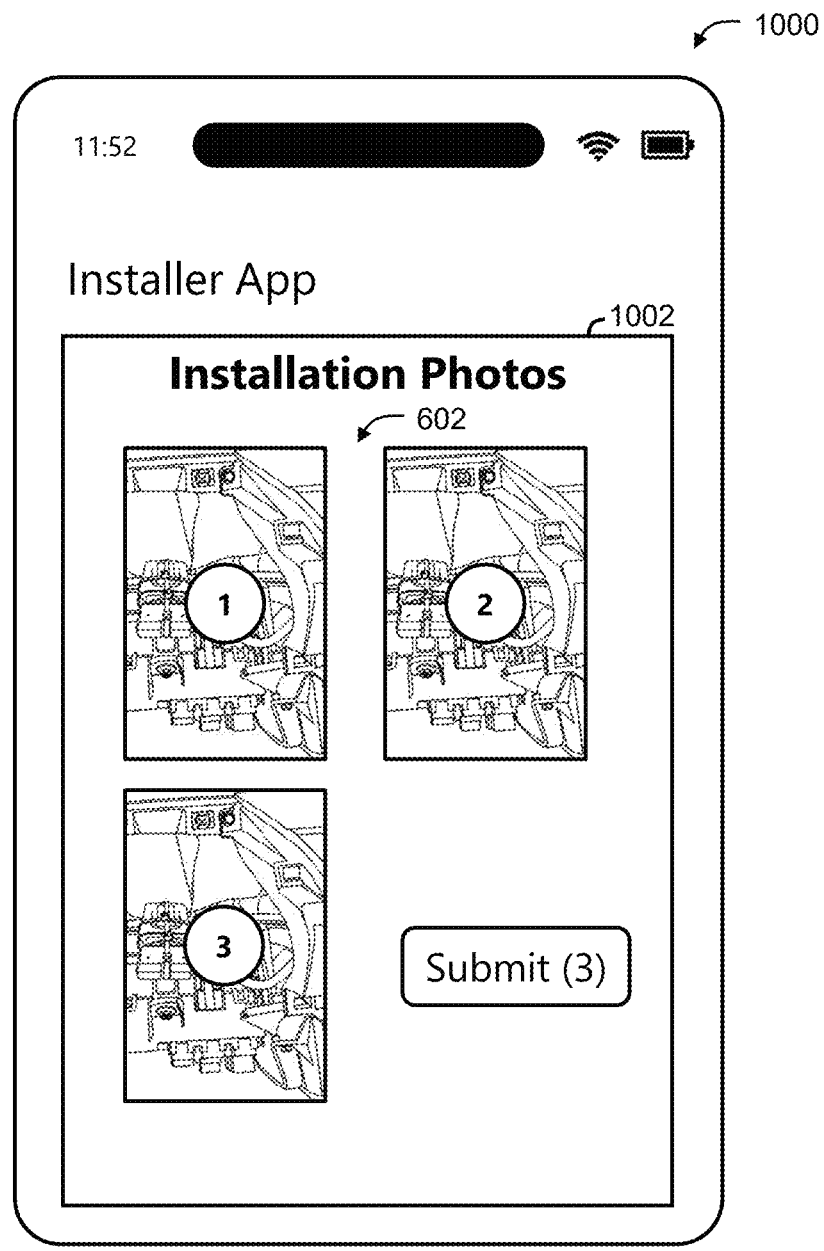
FIG. 10 is an example user interface for uploading image data associated with a telematics device installation, in accordance with an embodiment.

FIG. 10 shows an example user interface 1000 that can be displayed at a computing device 150 associated with a user 160. In the illustrated example, an electronic form 1002 requests and accepts image data 602 from the user 160. The user interface 1000 can be used by an installer to submit image files associated with an installation of a telematics device 130. The images can be submitted by the installer to provide evidence of completion and proper installation. The submitted image data 602 can be used by the bad installation detection system 600 and/or bad installation detection method 900 to verify whether the installation was correct or incorrect. In some embodiments, the installer may be prompted to submit additional image data 602 after the bad installation detection system 600 and/or bad installation detection method 900 determines that the installation was improper. The additional image data 602 can be used to verify that the improper installation was corrected. The additional image data 602 can be further analyzed by the bad installation detection system 600 and/or bad installation detection method 900 to verify that the installation was corrected. The installer may be required to upload additional image data 602 until the installation is determined to be correct.

Figure 11:
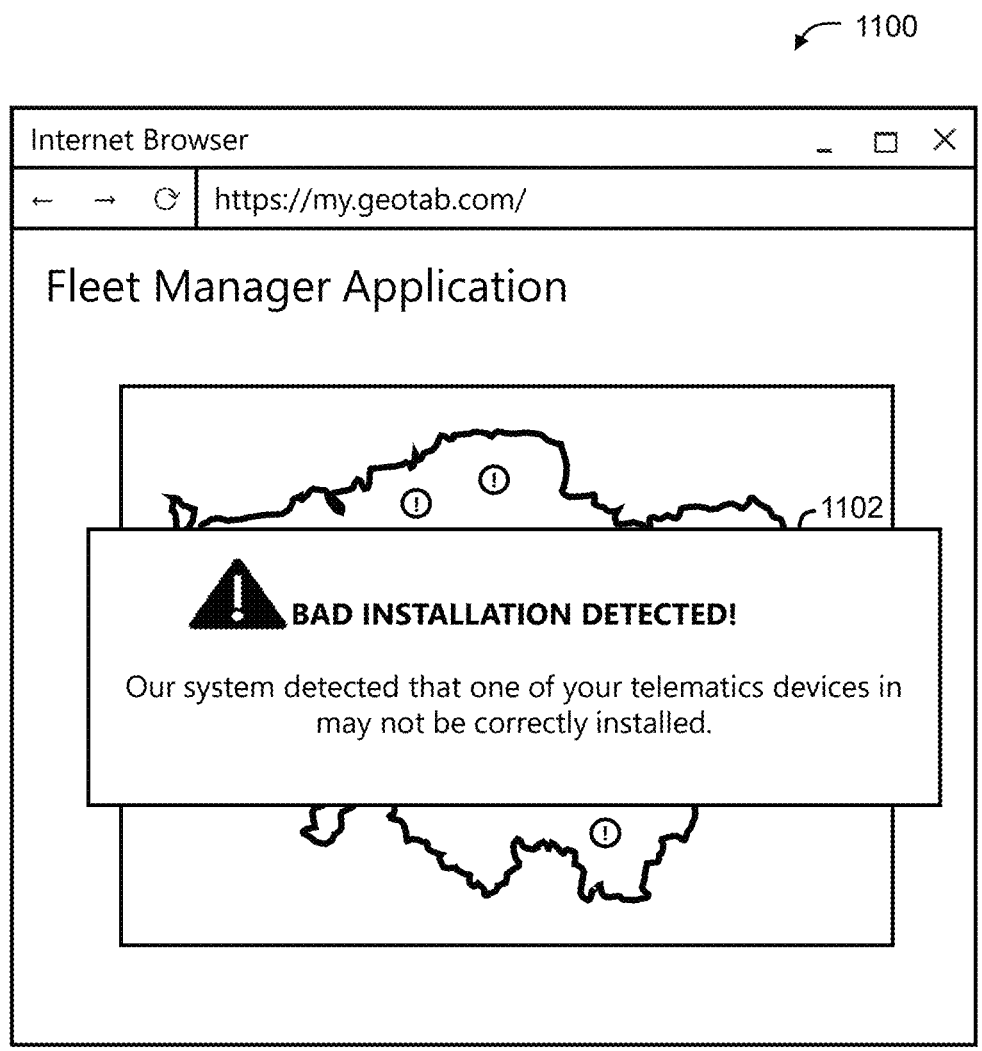
FIG. 11 is an example user interface for notifying a user whether a telematics device was installed correctly, in accordance with an embodiment.

FIG. 11 shows another example user interface 1100 that can be displayed at a computing device 150 associated with a user 160. In the illustrated example, an electronic notification 1102 informs the user 160 that a telematics device 130 is incorrectly installed. The user interface 1100 can be used to alert a fleet manager of improper installations of telematics devices 130. This can allow the fleet manager to take corrective actions to fix improper installations, which may otherwise be difficult to access, let alone detect. For example, in response to the notification, the fleet manager may contact an installer, driver, or other user 160 to address the installation issues. The electronic notification 1102 can be caused to be displayed by the automatic responder 630 of the bad installation detection system 600 and/or at 908 of the bad installation detection method 900.

Figure 12:
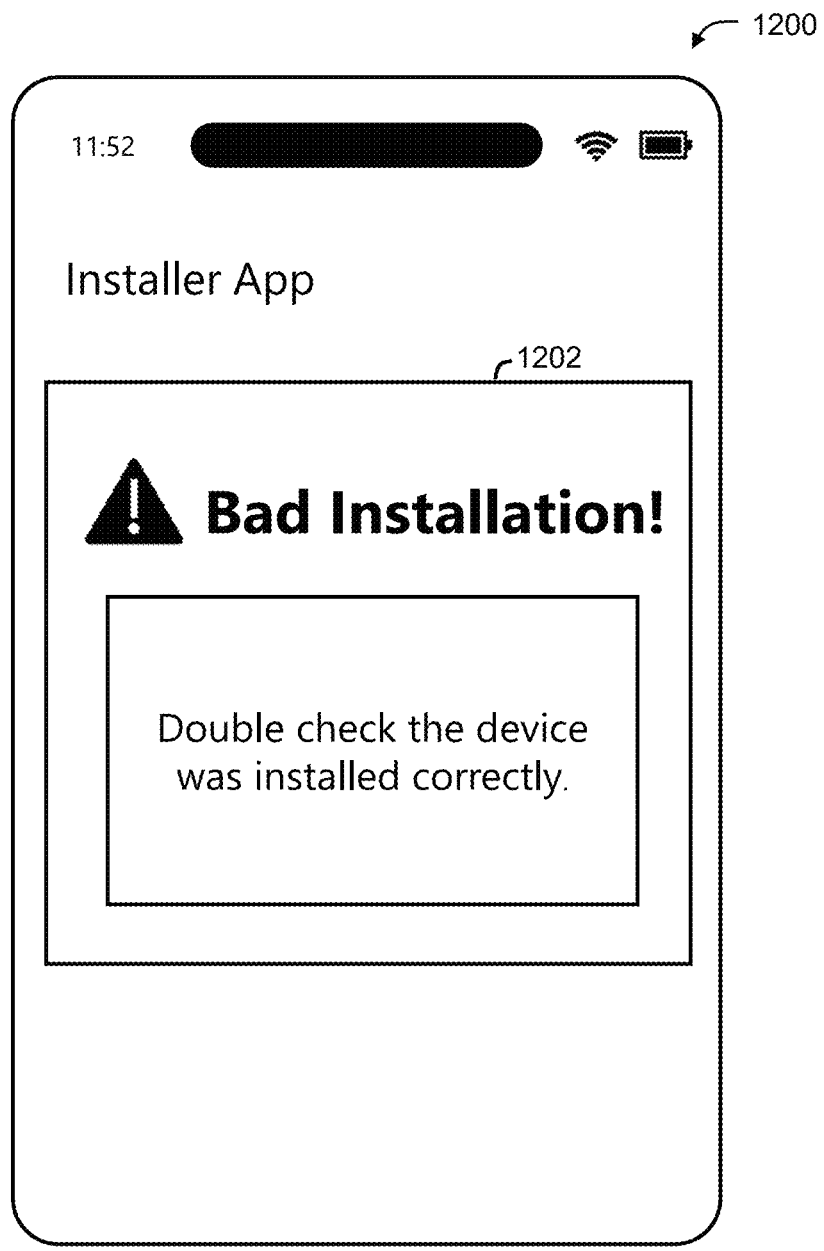
FIG. 12 is another example user interface for notifying a user whether a telematics device was installed correctly, in accordance with an embodiment.

FIG. 12 shows another example user interface 1200 that can be displayed at a computing device 150 associated with a user 160. In the illustrated example, an electronic notification 1202 informs the user 160 that a telematics device 130 was incorrectly installed. The user interface 1200 can be used to alert an installer of improper installations of telematics devices 130. This can allow the installer to take immediate corrective actions to fix improper installations, which may be otherwise difficult to detect, let alone in a timely manner. The electronic notification 1202 can be caused to be displayed by the automatic responder 630 of the bad installation detection system 600 and/or at 908 of the bad installation detection method 900.

Figure 13:
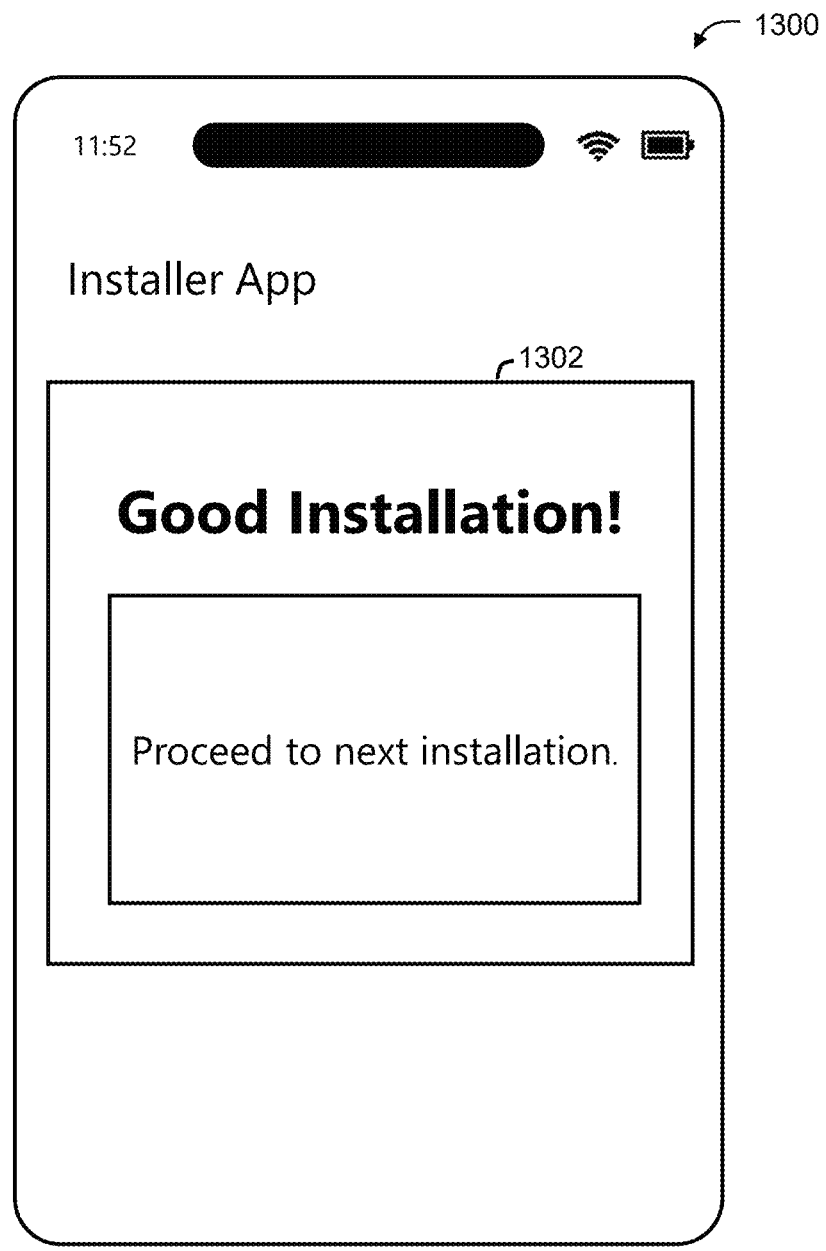
FIG. 13 is another example user interface for notifying a user whether a telematics device was installed correctly, in accordance with an embodiment.

FIG. 13 shows another example user interface 1300 that can be displayed at a computing device 150 associated with a user 160. In the illustrated example, an electronic notification 1302 informs the user 160 that a telematics device 130 was correctly installed. The user interface 1300 can be used to alert an installer of correct installations of telematics devices 130. This can allow the installer to proceed to a subsequent installation with the knowledge that their previous installation was correct, which may otherwise be difficult to detect, let alone in a timely manner. The electronic notification 1302 can be caused to be displayed by the automatic responder 630 of the bad installation detection system 600 and/or at 908 of the bad installation detection method 900.

Figure 14:
FIG. 14 is an example user interface for uploading feedback data indicating whether a telematics device was actually installed correctly, in accordance with an embodiment.

FIG. 14 shows another example user interface 1300 that can be displayed at a computing device 150 associated with a user 160. In the illustrated example, an electronic form 1402 requests and accepts feedback from the user 160 as to whether a telematics device 130 is actually incorrectly installed. The user interface 1300 can be used to request feedback data from an installer to verify predictions made by the bad installation detection system 600 and/or the bad installation detection method 900. The feedback data can be used to assess the accuracy of the machine learning models. The feedback data can also be used to retrain the machine learning models to improve their accuracy. The electronic form 1402 can be caused to be displayed by the automatic responder 630 of the bad installation detection system 600 and/or at 908 of the bad installation detection method 900.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device. Furthermore, the term "coupled" may indicate that two elements can be directly coupled to one another or coupled to one another through one or more intermediate elements.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Furthermore, any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). Programmable hardware such as FPGA can also be used as standalone or in combination with other devices. These devices may also have at least one input device (e.g., a pushbutton keyboard, mouse, a touchscreen, and the like), and at least one output device (e.g., a display screen, a printer, a wireless radio, and the like) depending on the nature of the device. The devices may also have at least one communication device (e.g., a network interface).

It should also be noted that there may be some elements that are used to implement at least part of one of the embodiments described herein that may be implemented via software that is written in a high-level computer programming language such as object-oriented programming. Accordingly, the program code may be written in C, C++ or any other suitable programming language and may comprise modules or classes, as is known to those skilled in object-oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

The invention claimed is:

1. A system for detecting bad installations of telematics devices, the system comprising:
 at least one data storage; and
 at least one processor in communication with the at least one data storage, the at least one processor operable to:
  receive image data associated with an installation of a telematics device in a vehicle;
  extract a portion of the image data containing the telematics device using a first machine learning model trained to detect the telematics device in the image data;
  determine whether the telematics device was correctly installed using a second machine learning model on the extracted portion of the image data, the second machine learning model trained to classify the telematics device in the extracted portion of the image data based on a position and orientation of at least one fastener attached to the telematics device; and
  automatically execute at least one action in response to and based on the determination of whether the telematics device was correctly installed.

2. The system of claim 1, wherein the at least one processor is operable to:
 determine that the first machine learning model detected the telematics device in the image data and the extracted portion of the image data does not contain the telematics device;
 wherein the at least one action comprises retraining the first machine learning model using the image data.

3. The system of claim 1, wherein the second machine learning model classifies the telematics device based on whether the at least one fastener encircles the telematics device.

4. The system of claim 1, wherein the at least one fastener comprises a first fastener and a second fastener.

5. The system of claim 4, wherein the second machine learning model classifies the telematics device based on whether the first and second fasteners intersect.

6. The system of claim 4, wherein the second machine learning model classifies the telematics device based on whether the first and second fasteners are perpendicular to each other.

7. The system of claim 4, wherein the second machine learning model classifies the telematics device based on whether an intersection of the first and second fasteners is substantially in the middle of the telematics device.

8. The system of claim 1, wherein the at least one processor is operable to:
 receive telematics data from the telematics device; and
 wherein the determination of whether the telematics device was correctly installed is further based on the telematics data received from the telematics device.

9. The system of claim 1, wherein the at least one processor to is operable to:
 receive telematics data from a plurality of telematics devices including the telematics device;
 wherein the at least one action comprises in response to determining that the telematics device was not installed correctly, processing the telematics data excluding telematics data received from the telematics device.

10. The system of claim 1, wherein the at least one action comprises:
 displaying, at a computing device associated with an installer, a request to confirm whether the telematics device was installed correctly;
 receiving feedback data from the computing device indicating whether the telematics device was installed correctly; and
 retraining the first and/or second machine learning model based on the feedback data.

11. A method for detecting bad installations of telematics devices, the method comprising operating at least one processor to:
 receive image data associated with an installation of a telematics device in a vehicle;
 extract a portion of the image data containing the telematics device using a first machine learning model trained to detect the telematics device in the image data;
 determine whether the telematics device was correctly installed using a second machine learning model on the extracted portion of the image data, the second machine learning model trained to classify the telematics device in the extracted portion of the image data based on a position and orientation of at least one fastener attached to the telematics device; and
 automatically execute at least one action in response to and based on the determination of whether the telematics device was correctly installed.

12. The method of claim 11, further comprising operating the at least one processor to:

determine that the first machine learning model detected the telematics device in the image data and the extracted portion of the image data does not contain the telematics device;

wherein the at least one action comprises retraining the first machine learning model using the image data.

13. The method of claim 11, wherein the second machine learning model classifies the telematics device based on whether the at least one fastener encircles the telematics device.

14. The method of claim 11, wherein the at least one fastener comprises a first fastener and a second fastener.

15. The method of claim 14, wherein the second machine learning model classifies the telematics device based on whether the first and second fasteners intersect.

16. The method of claim 14, wherein the second machine learning model classifies the telematics device based on whether the first and second fasteners are perpendicular to each other.

17. The method of claim 14, wherein the second machine learning model classifies the telematics device based on whether an intersection of the first and second fasteners is substantially in the middle of the telematics device.

18. The method of claim 11, further comprising operating the at least one processor to:

receive telematics data from the telematics device; and wherein the determination of whether the telematics device was correctly installed is further based on the telematics data received from the telematics device.

19. The method of claim 11, further comprising operating the at least one processor to:

receive telematics data from a plurality of telematics devices including the telematics device;

wherein the at least one action comprises in response to determining that the telematics device was not installed correctly, processing the telematics data excluding telematics data received from the telematics device.

20. The method of claim 11, wherein the at least one action comprises:

displaying, at a computing device associated with an installer, a request to confirm whether the telematics device was installed correctly;

receiving feedback data from the computing device indicating whether the telematics device was installed correctly; and retraining the first and/or second machine learning model based on the feedback data.

21. A non-transitory computer readable medium having instructions stored thereon executable by at least one processor to implement a method for detecting bad installations of telematics devices, the method comprising operating the at least one processor to:

receive image data associated with an installation of a telematics device in a vehicle;

extract a portion of the image data containing the telematics device using a first machine learning model trained to detect the telematics device in the image data;

determine whether the telematics device was correctly installed using a second machine learning model on the extracted portion of the image data, the second machine learning model trained to classify the telematics device in the extracted portion of the image data based on a position and orientation of at least one fastener attached to the telematics device; and automatically execute at least one action in response to and based on the determination of whether the telematics device was correctly installed.

* * * * *